(12) United States Patent
Cohen et al.

(10) Patent No.: US 8,935,347 B2
(45) Date of Patent: Jan. 13, 2015

(54) PRIORITY INBOX NOTIFICATIONS AND SYNCHRONIZATION FOR MESSAGING APPLICATION

(71) Applicants: Gabriel Cohen, Alameda, CA (US); Paul T. Westbrook, San Jose, CA (US); Debajit Ghosh, Menlo Park, CA (US); Subir Jhanb, Mountain View, CA (US)

(72) Inventors: Gabriel Cohen, Alameda, CA (US); Paul T. Westbrook, San Jose, CA (US); Debajit Ghosh, Menlo Park, CA (US); Subir Jhanb, Mountain View, CA (US)

(73) Assignee: Google Inc., Mountain View, CA (US)

( * ) Notice: Subject to any disclaimer, the term of this patent is extended or adjusted under 35 U.S.C. 154(b) by 252 days.

(21) Appl. No.: 13/651,323

(22) Filed: Oct. 12, 2012

(65) Prior Publication Data

US 2013/0041968 A1 Feb. 14, 2013

Related U.S. Application Data

(63) Continuation of application No. 12/985,258, filed on Jan. 5, 2011, now Pat. No. 8,312,096.

(60) Provisional application No. 61/421,167, filed on Dec. 8, 2010.

(51) Int. Cl.
*G06F 15/16* (2006.01)
(Continued)

(52) U.S. Cl.
CPC .............. *H04L 12/587* (2013.01); *H04L 51/26* (2013.01); *H04L 51/24* (2013.01);
(Continued)

(58) Field of Classification Search
CPC ..... G06Q 10/107; G06Q 10/10; G06Q 50/01; G06Q 10/00; H04L 51/26; H04L 12/58; H04L 51/12; H04L 12/585; H04L 12/587; H04L 51/24; H04L 51/32; H04L 63/0227; H04W 4/12

USPC ................ 455/412.1, 412.2, 414.1, 466, 566; 709/206, 207
IPC ............. H04W 4/12; H04L 51/26,12/58, 51/12, H04L 12/585, 12/587, 51/24, 51/32, 63/0227; G06Q 10/107, 10/10, 50/01, 10/00

See application file for complete search history.

(56) References Cited

U.S. PATENT DOCUMENTS 5,694,616 A 12/1997 Johnson et al.
(Continued)

FOREIGN PATENT DOCUMENTS

EP 1603066 A1 12/2005
(Continued)

OTHER PUBLICATIONS

Google Inc., International Preliminary Report on Patentability, PCT/US2011/049578, Mar. 14, 2013, 9 pgs.
(Continued)

*Primary Examiner* — Olumide T Ajibade Akonai
(74) *Attorney, Agent, or Firm* — Morgan, Lewis & Bockius LLP

(57) ABSTRACT

Systems and methods for priority inbox notifications and synchronization are disclosed. In some embodiments, a method includes, at a computer system, obtaining message information from a server system. The message information represents a set of messages and an importance score associated with each message in the set of messages. The importance score is generated based at least in part on a global importance prediction model and a user importance prediction model. A new mail notification is presented when a determination is made that the set of messages include one or more unread priority messages. The priority messages comprise messages with which the associated importance score satisfy one or more predefined message importance criteria: Optionally, presentation of a new mail notification is foregone when there is a determination that the set of messages do not include any unread priority messages.

27 Claims, 30 Drawing Sheets

(51) Int. Cl.
*H04L 12/58* (2006.01)
*G06Q 10/10* (2012.01)
*H04W 4/12* (2009.01)

(52) U.S. Cl.
CPC .............. *G06Q 10/107* (2013.01); *H04W 4/12* (2013.01); *G06Q 10/10* (2013.01); *H04L 12/58* (2013.01)
USPC ..... 709/206; 709/207; 455/412.1; 455/412.2; 455/414.1; 455/466; 455/566

(56) References Cited

U.S. PATENT DOCUMENTS

| | | |
|---|---|---|
| 6,351,764 B1 | 2/2002 | Voticky et al. |
| 6,647,409 B1 | 11/2003 | Sherman et al. |
| 7,181,495 B2 | 2/2007 | Skladman et al. |
| 7,509,381 B1 | 3/2009 | Hutchinson et al. |
| 7,890,596 B2 | 2/2011 | Guy |
| 7,899,866 B1 * | 3/2011 | Buckingham et al. ........ 709/206 |
| 8,095,613 B1 | 1/2012 | Perkowitz et al. |
| 2003/0195937 A1 | 10/2003 | Kircher, Jr. et al. |
| 2004/0220834 A1 | 11/2004 | Pellinat |
| 2005/0044500 A1 | 2/2005 | Orimoto et al. |
| 2005/0223057 A1 | 10/2005 | Buchheit et al. |
| 2005/0267944 A1 | 12/2005 | Little |
| 2006/0010217 A1 | 1/2006 | Sood |
| 2006/0031782 A1 | 2/2006 | Houmura et al. |
| 2006/0041583 A1 | 2/2006 | Horvitz |
| 2006/0235933 A1 | 10/2006 | Baluja et al. |
| 2007/0254723 A1 | 11/2007 | Chu et al. |
| 2008/0028031 A1 | 1/2008 | Bailey et al. |
| 2008/0162642 A1 | 7/2008 | Bachiri et al. |
| 2008/0195707 A1 | 8/2008 | May et al. |
| 2008/0195717 A1 | 8/2008 | Brown |
| 2009/0144655 A1 | 6/2009 | Hardy et al. |
| 2009/0182832 A1 * | 7/2009 | O'Sullivan et al. ........... 709/207 |
| 2009/0210507 A1 | 8/2009 | Haverkos |
| 2009/0254498 A1 | 10/2009 | Gupta et al. |
| 2010/0042570 A1 | 2/2010 | Mayers et al. |
| 2010/0153500 A1 | 6/2010 | O'Sullivan et al. |
| 2010/0197355 A1 | 8/2010 | Irie et al. |
| 2010/0211641 A1 | 8/2010 | Yih et al. |
| 2010/0251362 A1 | 9/2010 | Gillum et al. |
| 2010/0281397 A1 | 11/2010 | Buchheit et al. |
| 2010/0281409 A1 | 11/2010 | Rainisto et al. |
| 2011/0119258 A1 | 5/2011 | Forutanpour et al. |

FOREIGN PATENT DOCUMENTS

| | | |
|---|---|---|
| JP | 2003-527656 | 9/2006 |
| JP | 2009-175899 | 8/2009 |
| WO | WO 01/09753 A2 | 2/2001 |

OTHER PUBLICATIONS

Google Inc., International Preliminary Report on Patentability, PCT/US2011/049580, Mar. 14, 2013, 8 pgs.

Google Inc., International Preliminary Report on Patentability, PCT/US2011/064020, Mar. 4, 2013, 25 pgs.

Google Inc., International Search Report/Written Opinion, PCT/US2011/049578, Dec. 20, 2011, 10 pgs.

Google Inc., International Search Report/Written Opinion, PCT/US2011/049580, Jan. 5, 2012, 9 pgs.

Google inc., International Search Report /Written Opinion, PCT/US2011/064020, Feb. 3, 2012, 9 pgs.

Google Inc., Communication pursuant to Article 94(3) EPC, EP 11801938.9, Dec. 16, 2013, 5 pgs.

Google Inc., Notice of Reasons for Rejection, JP 2013-543359, Oct. 29, 2013, 4 pgs.

* cited by examiner

PRIORITY INBOX NOTIFICATIONS AND SYNCHRONIZATION FOR MESSAGING APPLICATION

RELATED APPLICATIONS

This application is a continuation of U.S. patent application Ser. No. 12/985,258, filed Jan. 5, 2011, now U.S. Pat. No. 8,312,096, entitled "Priority Inbox Notifications and Synchronization for Mobile Messaging Application," which is hereby incorporated by reference in its entirety.

TECHNICAL FIELD

The disclosed embodiments relate generally to displaying messages, such as email, instant, and voicemail messages.

BACKGROUND

As the popularity of email communication has grown, so too has the number of email messages received and stored in user accounts. A user account typically includes all the messages sent to and from a respective email address or user name, excluding messages deleted from the account. However, some user accounts may be associated with a plurality of email addresses or user names, sometimes called aliases, which together may be considered to be a single logical email address or user name. The amount of received email can quickly overwhelm users—making it difficult to sift important messages from unimportant ones.

Additionally, many people now access and view their email on mobile devices, such as handheld computers or cell phones. Such mobile devices typically have small screens with even smaller message windows or interfaces for viewing messages. These interfaces often allow the user to view only a small number of messages at any given time, thereby requiring the user to interact more frequently with the interface to locate important messages, such as through scrolling through the messages. Such mobile devices may also employ network connectivity, which is sometimes charged by usage and is often slow. Furthermore, such mobile devices typically use battery power, and more frequent interaction with the device depletes the battery more quickly. Users of these devices might wish to limit the messages they view to those of high importance when accessing message through this medium.

To deal with these problems, some message interfaces allow users to organize messages into folders or to apply user-defined labels to messages for easier identification. Additionally, in some email applications, users may order messages in a particular view in accordance with the value of single user-selected message header field, such as message delivery date, sender, or message title. However, these organizational techniques often fail to identify the messages that are most important to the user, leaving the user to scroll through many messages before locating the messages that he or she considers to be most important.

SUMMARY

In accordance with some embodiments, a method for presenting notifications at a computer system includes obtaining message information, the message information representing a set of messages, and an importance score associated with each message in the set of messages. The importance score is generated based at least in part on a global importance prediction model and a user importance prediction model. The method further includes presenting a new mail notification when there is a determination that the set of messages include one or more unread priority messages. Priority messages comprise messages with which the associated importance score satisfy one or more predefined message importance criteria. The method optionally includes foregoing presenting a new mail notification when there is a determination that the set of messages do not include any unread priority messages.

BRIEF DESCRIPTION OF THE DRAWINGS

Various embodiments are disclosed in the following Description of Embodiments herein, in conjunction with the following drawings in which like reference numerals refer to corresponding parts throughout the figures.

Like reference numerals refer to corresponding parts throughout the drawings.

DESCRIPTION OF EMBODIMENTS

Methods, systems, user interfaces, and other aspects of the disclosed embodiments are described. Reference will be made to certain disclosed embodiments, examples of which are illustrated in the accompanying drawings. The specification and drawings are, to be regarded in an illustrative rather than a restrictive sense and is intended to cover alternatives, modifications and equivalents.

Moreover, in the following description, numerous specific details are set forth to provide a thorough understanding of the disclosed embodiments. However, it will be apparent to one of ordinary skill in the art that the disclosed embodiments can be practiced without these particular details. In other instances, methods, procedures, components, and networks that are well known to those of ordinary skill in the art are not described in detail to avoid obscuring aspects of the disclosed embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the disclosed embodiments. The first contact and the second contact are both contacts, but they are not the same contact.

The terminology used in the description of the embodiments disclosed herein is for the purpose of describing particular embodiments only and is not intended to be limiting of the disclosed embodiments. As used in the description of the disclosed embodiments and the appended claims, the singular forms "a", "an" and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Figure 1A:
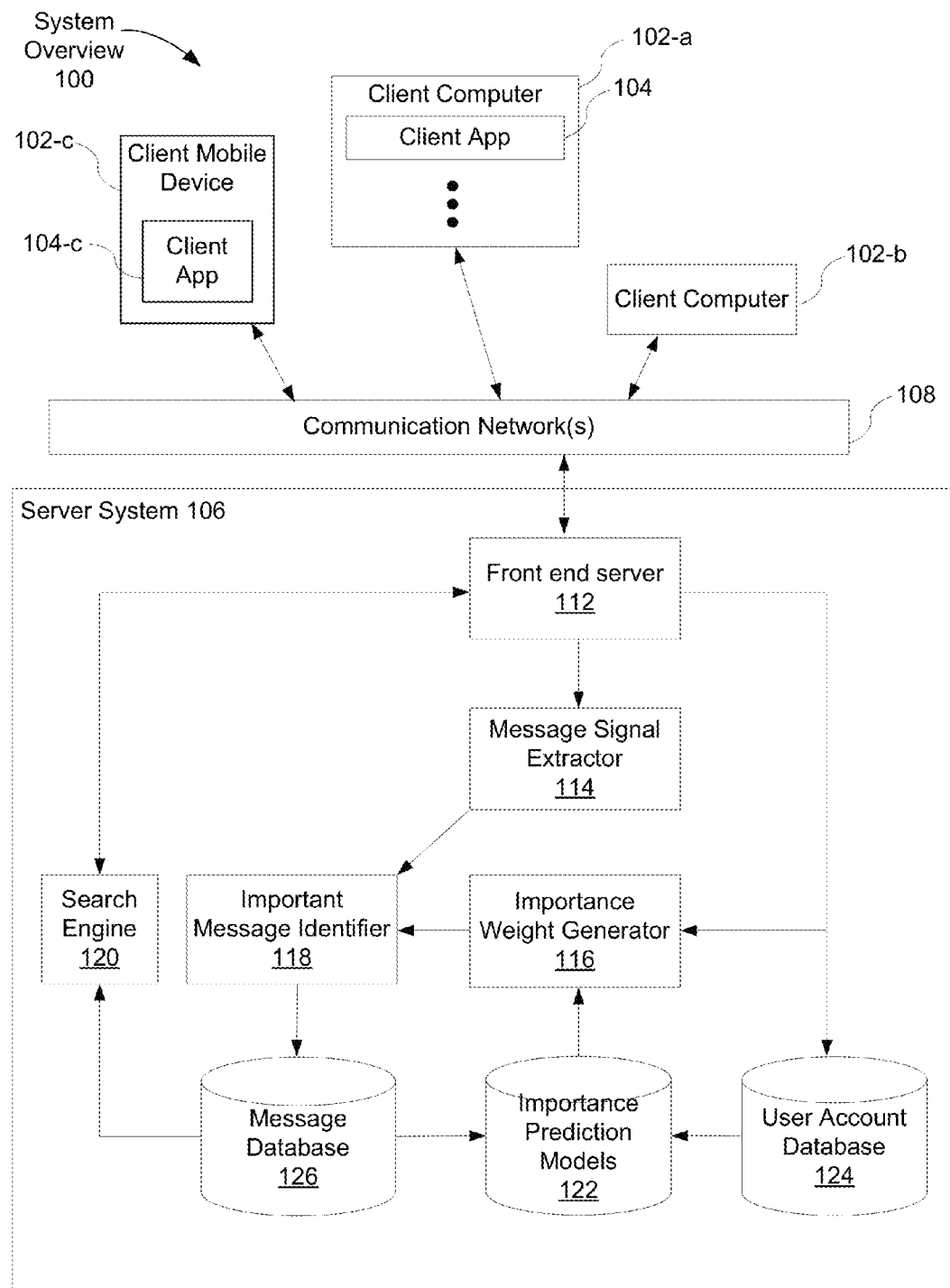
FIG. 1A is a block diagram illustrating an overview of a distributed client-server system according to some embodiments.

FIG. 1A is a block diagram of a distributed computer system 100 including client systems 102 and a server system 106 according to some embodiments. The server system 106 is connected to client computers 102 through one or more communication networks 108.

Client computer 102 (sometimes called a "client system," "client device" or "client") may be any computer or device through which a user of the client computer 102 can submit service requests to and receive messaging services or other services from the server system 106. Examples of client computers 102 include, without limitation, desktop computers, laptop computers, tablet computers, mobile devices such as mobile phones (sometimes called cell phones or smart phones), personal digital assistants, set-top boxes, or any combination of the above. A respective client computer 102 may contain one or more client applications 104 for submitting requests to the server system 106. For example, client application 104 can be a web browser or other application that permits a user to search for, browse, and/or use information (e.g., web pages and web services) accessible through the communication network 108. As another example, client application 104 can be an email or other messaging application that permits a user to read, compose, and send email and/or other messages.

The communication network(s) 108 can be any wired or wireless local area network (LAN) and/or wide area network (WAN), such as an intranet, an extranet, a mobile phone network, the Internet, or a combination of such networks. In some embodiments, the communication network 108 uses the HyperText Transport Protocol (HTTP) and the Transmission Control Protocol/Internet Protocol (TCP/IP) to transport information between different networks. The HTTP permits client devices to access various information items available on the Internet via the communication network 108. The disclosed embodiments, however, are not limited to the use of any particular protocol.

In some embodiments, the server system 106 includes a front end server 112, a message signal extractor 114, an importance weight generator 116, an important message identifier 118, importance prediction models 122, a user account database 124, a message database 126, and a search engine 120 for searching message database 126.

The front end server 112 is configured to receive data from a client computer 102. In some embodiments the data is a message, HTTP request, Ajax request, IMAP (Internet Message Access Protocol) request, POP (Post Office Protocol) request, or other communication. The HTTP request or Ajax request may include a search query (e.g., "label:inbox") for processing by the search engine 120.

In some embodiments, a message associated with a particular user is received by the server system 106, where user data regarding the particular user is stored in the user account database 124. The received message is stored in message database 126. In implementations that organize messages into conversations (sometimes called threads or message threads), the message is stored in message database 126 either as a new conversation, or as a new message in an existing conversation.

When a message is received by the server system 106, the message is sent from the front end server 112 to the message signal extractor 114, which extracts one or more message signals from the message. For each message signal of at least a subset of the extracted message signals, an importance weight is generated by importance weight generator 116 using importance prediction models 122. Based on the message signals and their generated importance weights, important message identifier 118 determines an importance score for the message. In some embodiments, the importance score of the message is used by important message identifier 118 for comparison with a threshold to determine importance of the message.

Figure 1B:
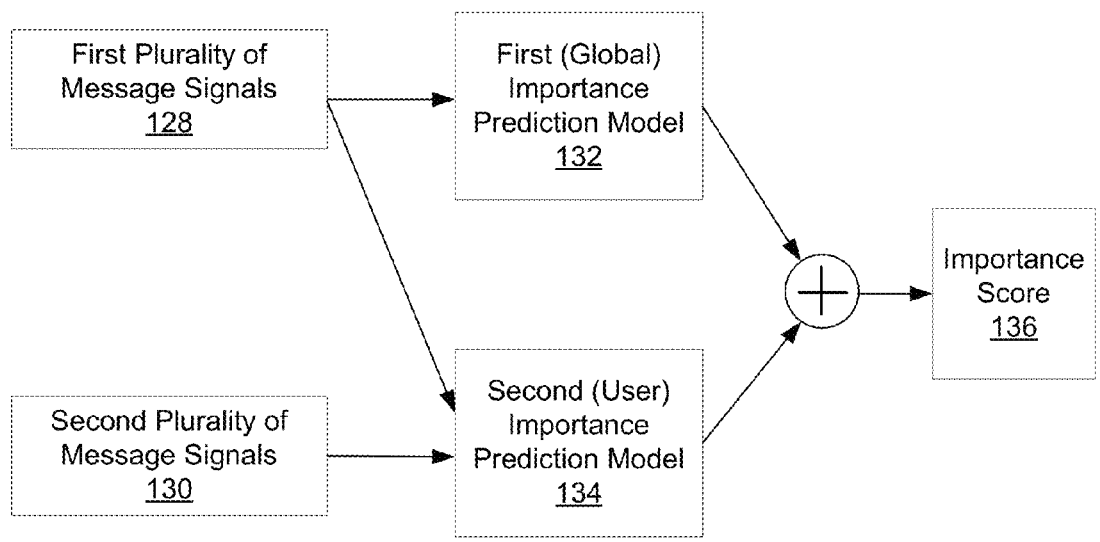
FIG. 1B is a block diagram illustrating a process of generating importance scores for messages according to some embodiments.

FIG. 1B is a block diagram illustrating a process of generating importance scores for messages according to some embodiments. Importance prediction models 122 include a first importance prediction model 132 and a second importance prediction model 134. Both the first importance prediction model 132 and the second importance prediction model 134 include a plurality of weights, each corresponding to respective message signals. The first importance prediction model 132 is based on information associated with multiple users. The first importance prediction model 132 is also called the global importance prediction model. The second importance prediction model 134 is based on information associated with a respective user (i.e., a single user). The second importance prediction model 134 is also called the user importance prediction model.

In some embodiments, the extracted message signals include a first plurality of message signals 128. For each message signal of the first plurality of message signals 128, the importance weight generator 116 generates an importance weight for the respective message signal by determining a first weight for the respective message signal using the first importance prediction model 132, determining a second weight for the respective message signal using the second importance prediction model 134, and combining the first weight and the second weight to determine the importance weight of the respective message signal. In some embodiments, the combining includes adding the first and second weight. Furthermore, in some implementations, the importance weight generator 116 performs table lookup or database lookup operations to obtain the first weight and second weight. As discussed below in more detail with reference to FIG. 5A, the importance weights in the various importance prediction models may be generated and updated using machine learning techniques. Optionally, in addition to a global importance prediction model and a user importance prediction model, the server system also uses a group importance prediction model, for a respective plurality of users (also called a group of users) that include the user for whom message services are being performed. In such implementations, weights from all three importance prediction models are determined and applied to corresponding extracted message signals so as to generate a combined importance score for a respective message.

It is noted that respective weights in the importance prediction models can have both positive and negative values. Weights with positive values are typically associated with message signals that are predictive of message importance. Weights with negative values are typically associated with message signals (e.g., a signal identifying that the message was automatically generated, or a signal that indicates the message includes one or more words on a predefined black list) that are associated with unimportant messages.

In some embodiments, the extracted message signals include a second plurality of message signals 130. For each message signal of the second plurality of message signals 130, importance weight generator 116 generates an importance weight for the respective message signal using second importance prediction model 134 but not first importance prediction model 132. Thus, the second plurality of message signals 130 are message signals for which user-specific weights are generated, but for which global model weights are not generated.

In some embodiments, important message identifier 118 determines importance score 136 for the message based on the generated importance weights of the first plurality of message signals 128. Alternatively, important message identifier 118 determines the importance score 136 for the message based on the generated importance weights of both the first plurality of message signals 128 and the second plurality of message signals 130.

In some embodiments, the first plurality of message signals 128 and the second plurality of message signals 130 are extracted and collected in an anonymous manner (i.e., specific users cannot be identified from the information in the message signals). For example, information in messages that can identify a specific user is excluded from extraction. As another example, the extracted and collected message signals may be aggregated in a manner such that any information that can identify a specific user is removed. In some other embodiments, at least some of the message signals are extracted and collected in a non-anonymous manner, and a user may opt out of extraction and collection of such message signals with respect to that user. Alternatively, in yet other embodiments a user is given the option of opting out of extraction and collection of message signals with respect to that user, regardless of whether or not any of the message signals that would be extracted and collected would contain personally identifiable information or non-anonymous information. In some further embodiments, at least some of the message signals are extracted and collected in a non-anonymous manner, but such signals are not extracted and collected with respect to a user unless that user opts into such extraction and collection. Alternatively, in yet other embodiments message signals are not extracted and collected with respect to a particular user unless that user opts into such extraction and collection, regardless of whether or not any of the message signals that would be extracted and collected would contain personally identifiable information or non-anonymous information.

Attention is now directed back to FIG. 1A. Once the importance score of the message has been determined by important message identifier 118, the message and information regarding importance of the message are stored in the message database 126. In some embodiments, the information regarding importance of the message is the importance score of the message. In some embodiments, the information regarding importance of the message is one or more labels denoting importance. For example, in one implementation, messages with the one or more labels (which denote message importance) have an importance score above a threshold. Alternatively, conversations having at least one message with an importance score above the threshold are assigned a label denoting importance. Messages that have an importance score above the threshold may be referred to as priority messages.

Search engine 120 communicates with message database 126 to retrieve the message along with information regarding importance of the message, and sends the message and information regarding importance of the message to front end server 112. Front end server 112 sends the message along with information regarding importance of the message to the user for display at a client device 102. Alternatively, message information corresponding to the message (e.g., the subject line of the message, information identifying the sender of the message, etc.) is sent by front end server 112, along with information regarding importance of the message to client device 102. In yet another alternative, message information corresponding to the conversation that includes the message (e.g., a subject line of a message in the conversation and/or a snippet of text from the conversation, information identifying the sender of the message, etc.) is sent by front end server 112, along with information regarding importance of the conversation to client device 102.

While the modules and data structures used to identify important messages have been illustrated above in server system 106, it should be understood that, in accordance with other embodiments, analogous modules and data structures which are also used to identify important messages are located at client device 102 instead of, or in addition to, the modules and data structures shown in server system 106 above.

Figure 2:
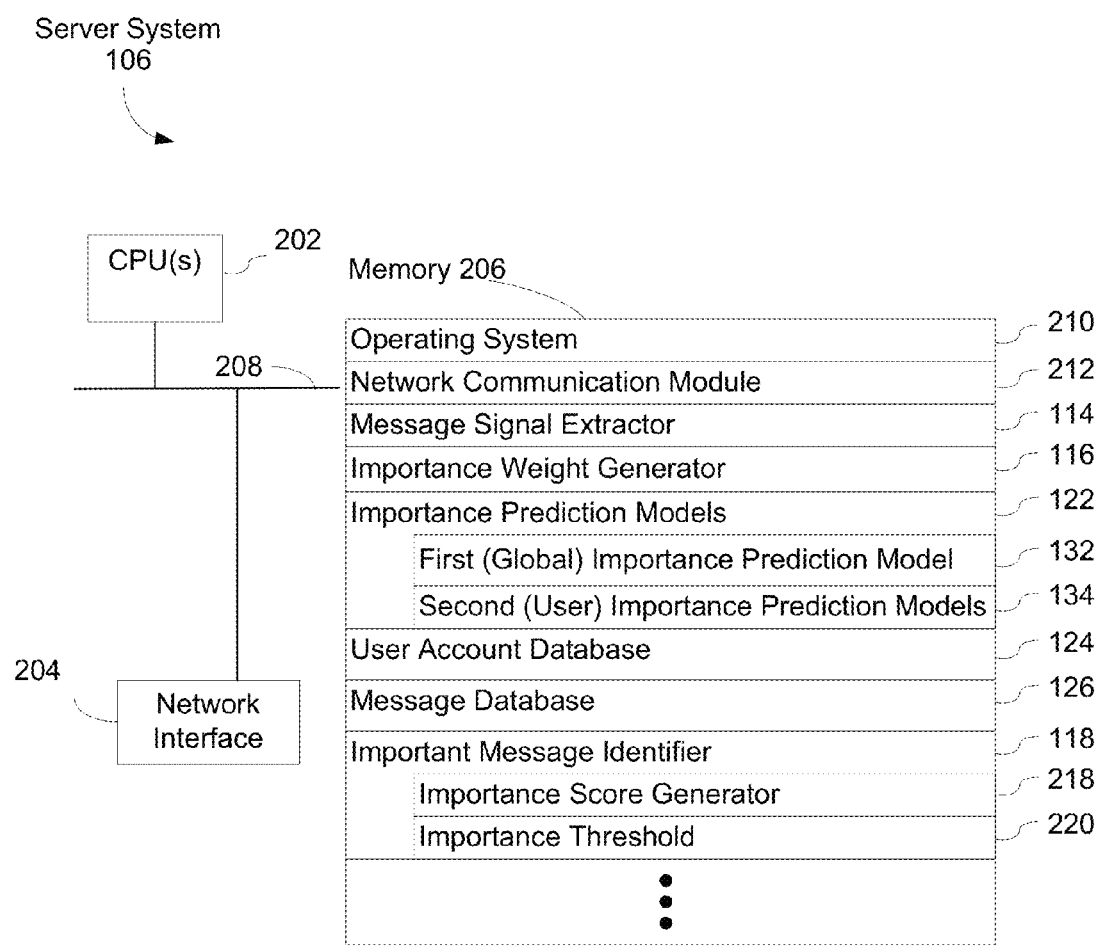
FIG. 2 is a block diagram illustrating a server system according to some embodiments.
Figure 3A:
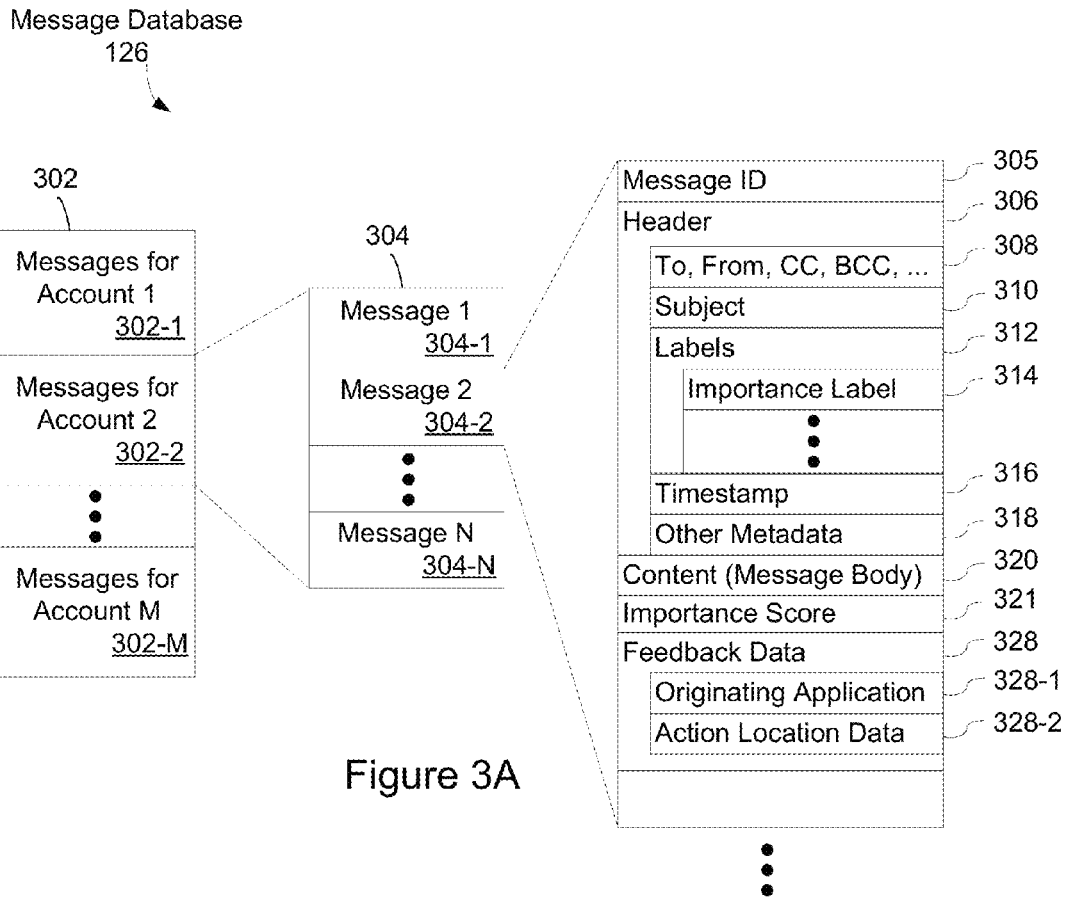
FIGS. 3A-3C are block diagrams of data structures for a message database a user account database, and an importance prediction models database, according to some embodiments.
Figure 3B:
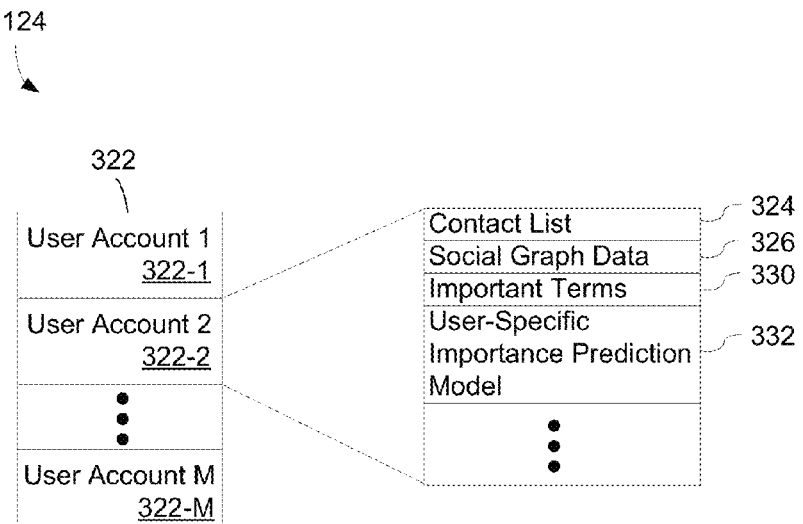

FIG. 2 is a block diagram illustrating a server system 106 in accordance with one embodiment of the disclosed embodiments. The server system 106 typically includes one or more processing units (CPU's) 202 for executing modules, programs and/or instructions stored in memory 206 and thereby performing processing operations; one or more network or other communications interfaces 204; memory 206; and one or more communication buses 208 for interconnecting these components. Communication buses 208 may include circuitry (sometimes called a chipset) that interconnects and controls communications between system components. Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternately the non-volatile memory device(s) within memory 206, comprises a non-transitory computer readable storage medium. In some embodiments, memory 206 or the computer readable storage medium of memory 206 stores the following programs, modules and data structures, or a subset thereof:

- an operating system 210 that includes procedures for handling various basic system services and for performing hardware dependent tasks;
- a network communication module 212 that is used for connecting the server computer 106 to other computers via the one or more communication network interfaces 204 (wired or wireless) and one or more communication networks, such as the Internet, other wide area networks, local area networks, metropolitan area networks, and so on;
- a message signal extractor 114, for extracting one or more message signals from the received message;
- an importance weight generator 116, for generating importance weights for each message signal of at least a subset of the extracted message signals;
- importance prediction models 122 including first importance prediction model 132 and one or more second importance prediction models 134 (e.g., one for each distinct user for whom message importance services are to be provided), for storing a plurality of weights, each corresponding to a respective message signal;
- a user account database 124, for storing user data, as discussed below with reference to FIG. 3B;
- a message database 126, for storing messages and related information, as discussed below with reference to FIG. 3A;
- an important message identifier 118, for generating importance scores for messages using an importance score generator 218; in some embodiments, the important message identifier 118 also includes an importance threshold 220 (or in some implementations, more than one importance threshold), which is used for determining importance of messages.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Although FIG. 2 shows a "server system," FIG. 2 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement a server system and how features are allocated among them will vary from one implementation to another, and may depend in part on the amount of data traffic that the system must handle during peak usage periods as well as during average usage periods.

FIG. 3A depicts an exemplary data structure of a message record 304 in message database 126 (FIG. 1A) according to some embodiments. The message database includes stores messages (in message records 304) for a plurality of user accounts such as Account 1, Account 2, . . . , and Account M. For a specific account such as Account 2, the database stores a set 302 of message records 304 corresponding to a plurality of messages such as Message 1, Message 2, . . . , and Message N. For a specific message such as Message 2, message data 304-2 includes header information 306 and message content 320. In some embodiments, message data 304-2 includes the importance score 321 of the message. Optionally, message data 304-2 further includes a message identifier 305 that uniquely identifies the message, and/or a conversation identifier and message identifier that together uniquely identify the message. Optionally, message data 304-2 for a respective message includes feedback data 328 (e.g., one or more of: time elapsed between message receipt and reading, whether the user has replied or forwarded the message, whether the user has read or replied or forwarded the message more than once, whether the user has explicitly labeled the message with a label not associated with spam email, whether the user has explicitly marked the message as being important, and whether the user has explicitly marked the message as not important). In some embodiments, feedback data 328 includes originating application data 328-1, which indicates the application in which the message was composed (e.g., a standalone email application, an email application opened in a web browser, etc.). In some embodiments, feedback data 328 includes action location data 328-2, which includes data indicating whether actions on the message taken by the user (e.g., reading, replying, forwarding, labeling, marking as important, marking as not important, etc.) were taken on a mobile device.

In some embodiments, header information 306 includes information 308 identifying the senders and recipients of the message, the message subject 310, one or more labels (if any) applied to the message 312, one or more time stamps 316, and other metadata 318. In some embodiments, the labels applied to a respective message 312 include an importance label 314 (e.g., when the message importance score exceeds a threshold), which denotes importance of the message. The one or more time stamps 316 include information indicating the time when the message is received by the user account, and optionally include time information (which may be stored in the header 306 or elsewhere in the database 302) that indicates the time(s) when the user read the message and the time(s) when the user replied to the message. Thus, the one or more time stamps 316 may be useful in calculating how quickly the user reads, responds to or otherwise interacts with the message. Optionally, other metadata 318 includes one of more values such as the number of times the message has been read, forwarded, and other metrics of interaction. The message content 320 contains the content of the message, e.g., text, images, and attachments. Those of ordinary skill in the art would recognize other ways to store the message information. For example, an attachment might be stored in another storage structure with a reference to it stored in the message record 304.

FIG. 3B depicts an exemplary data structure of a user account record 322 in the user account database 124 (FIG. 1A) according to some embodiments. The user account record 322 includes a plurality of user accounts such as User Account 1, User Account 2, . . . , and User Account M. For a specific user account such as User Account 2, user account record 322-2 includes a contact list 324 (or includes a pointer to contact list 324) that includes a list of contacts associated with the user, and optionally includes one or more of: social graph data 326, and important terms 330. Optionally, the user data 322-2 also includes a user-specific importance prediction model 332, which is described in greater detail below with respect to FIG. 3C.

Alternatively, user-specific importance prediction model 332 for a respective user or user account is stored in a separate database from user account database 124. It is noted that a user may have multiple accounts, or multiple usernames for messaging, and that in some implementations a single user-specific importance prediction model 332 is used in conjunction with two or more of the usernames and/or accounts of the user.

In some embodiments, the user has an associated social graph that includes one or more social graph members. Each of the one or more social graph members has a calculated social graph weight based on the interactions between the user and the respective social graph member. Social graph data 326 includes information regarding the one or more social graph members. In some embodiments, information regarding the one or more social graph members includes the calculated social graph weights of the one or more social graph members. Optionally, if the user sends and/or receives messages sent to a group of social graph members, social graph data 326 also includes weights for that group of members of the social graph. Thus, social graph data 326 for a respective user optionally includes weights for a plurality of groups of social graph members with whom the user has communicated as a group.

In some embodiments, server system 106 (FIG. 1A) collects feedback data from the user regarding importance of a respective message. For example, the user may explicitly mark a message as important, or not important. In another example, the speed with which a user opens a new message, or deletes a message without opening it, is treated as feedback data. In a further example, whether the user, on a mobile device (e.g., a mobile phone), read, replied to, forwarded, labeled, or marked as important or not important, a message is treated as feedback data. Optionally, the feedback data from the user is stored in the user account database 124. Alternatively, the feedback data is stored in the message database 126. Feedback data from the user is described in more detail below with reference to FIG. 5C.

Important terms 330 include terms determined to be indicative of message importance. In some embodiments, important terms 330 are specific to the user, and thus a respective user account 322 includes a set of user-specific important terms 330. Important terms are described in more detail below with reference to FIG. 5A.

Figure 3C:
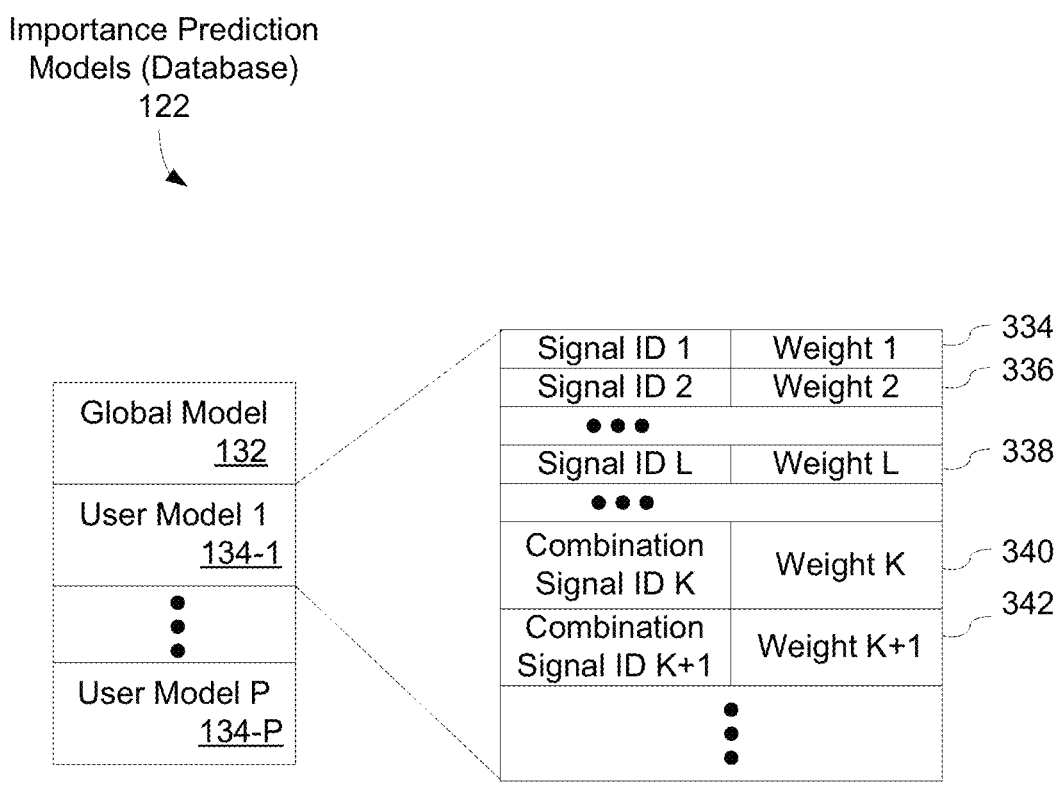

FIG. 3C depicts an exemplary data structure of importance prediction models 122 (FIG. 1A), according to some embodiments. Importance prediction models 122 includes a global importance prediction model 132 and a set of user importance prediction models 134 (FIG. 1B). User importance prediction models 134 include a plurality of user-specific importance prediction models, for a plurality of respective users. In this example, user-specific importance prediction models 134 include User Model 1, User Model 2, . . . , and User Model P. Both global model 132 and user-specific model such as User Model 1 include a plurality of weights, each corresponding to a respective message signal or a respective combination message signal. In some implementations, the message signals used include both individual message signals (each based on a single message signal) and one or more combination message signals (each based on two or more message signals). Combination message signals are described in more detail below with reference to FIG. 5A. In some embodiments, as shown in FIG. 3C, the plurality of weights and signal identifiers for their respective message signals are stored in records 334, 336, 338, 340, 342 in a look-up table in importance prediction model database 122.

Figure 4:
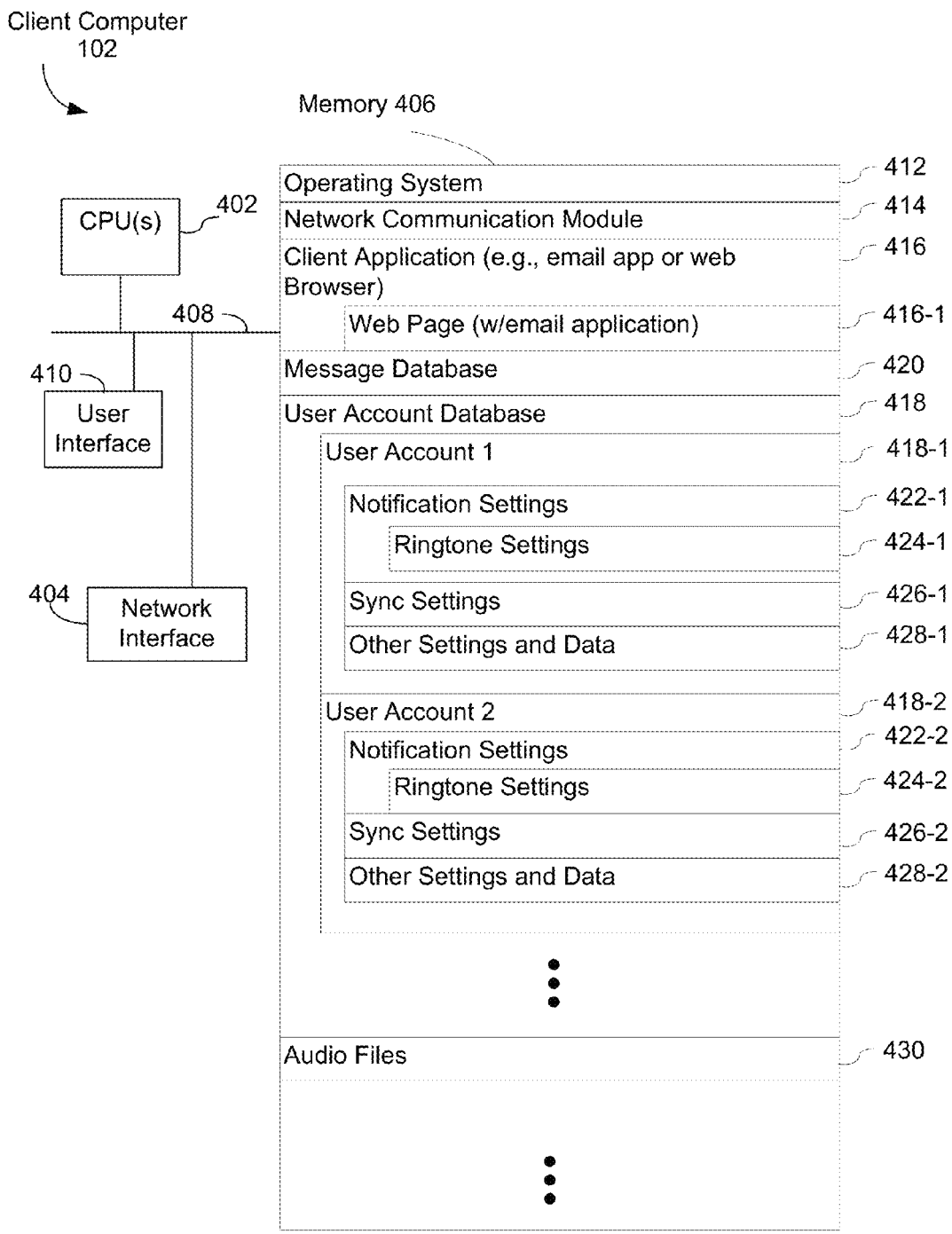
FIG. 4 is a block diagram illustrating a client system according to some embodiments.

FIG. 4 is a block diagram illustrating a client computer 102 in accordance with one embodiment of the disclosed embodiments. As noted above, a respective client computer 102 can be implemented as, without limitation, a desktop computer, laptop computer, tablet computer, mobile device such as a mobile phone (sometimes called a cell phone or smart phone), personal digital assistant, set-top box, or any combination of the above. Client computer 102 typically includes one or more processing units (CPU's) 402 for executing modules, programs and/or instructions stored in memory 406 and thereby performing processing operations; one or more network or other communications interfaces 404; memory 406; and one or more communication buses 408 for interconnecting these components. Communication buses 408 may include circuitry (sometimes called a chipset) that interconnects and controls communications between system components. Client computer 102 optionally may include a user interface 410 comprising a display device and a keyboard, mouse, touch-sensitive surface or other input device. Memory 406 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the CPU(s) 402. Memory 406, or alternately the non-volatile memory device(s) within memory 406, comprises a computer readable storage medium. In some embodiments, memory 406 or the computer readable storage medium of memory 406 stores the following programs, modules and data structures, or a subset thereof:

- an operating system 412 that includes procedures for handling various basic system services and for performing hardware dependent tasks;
- a network communication module 414 that is used for connecting the client computer 102 to other computers via the one or more communication network interfaces 404 (wired or wireless) and one or more communication networks, such as the Internet, other wide area networks, local area networks, metropolitan area networks, and so on;
- a client application 416, for rendering messages to the user of the client and receiving input from the user (e.g., labeling a message as important or unimportant);
- optionally, in embodiments where the client application 416 is a web browser, one or more web pages 416-1 of an email application user interface;
- optionally, a user account database 418, for storing user data; and
- optionally, a message database 420, for storing messages and other communication received from a server system 106.

User account database 418 includes account-specific settings. User account database 418 includes data 418-1 for Account 1, data 418-2 for User Account 2, and data for other user accounts, if any. In some embodiments, user account data 418 for a respective account includes one or more user-modifiable settings. Settings may include notification settings 422 for configuring new message notifications, ringtone settings 424 for customizing the sound for audio notifications, and sync settings 426 for configuring synchronization of messages between client computer 102 and server system 106. User account data 418 may also include other settings and data 428. Notification settings 422, ringtone settings 424, and sync settings 426 will be described in further detail in relation to FIGS. 8A-8F.

The client computer 102 also includes one or more audio files 430 stored in memory 406. The audio files 430 include ringtones, alert sounds, and other audio compositions or sound recordings that may be audible when played.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 406 may store a subset of the modules and data structures identified above. Furthermore, memory 406 may store additional modules and data structures not described above.

Figure 5A:
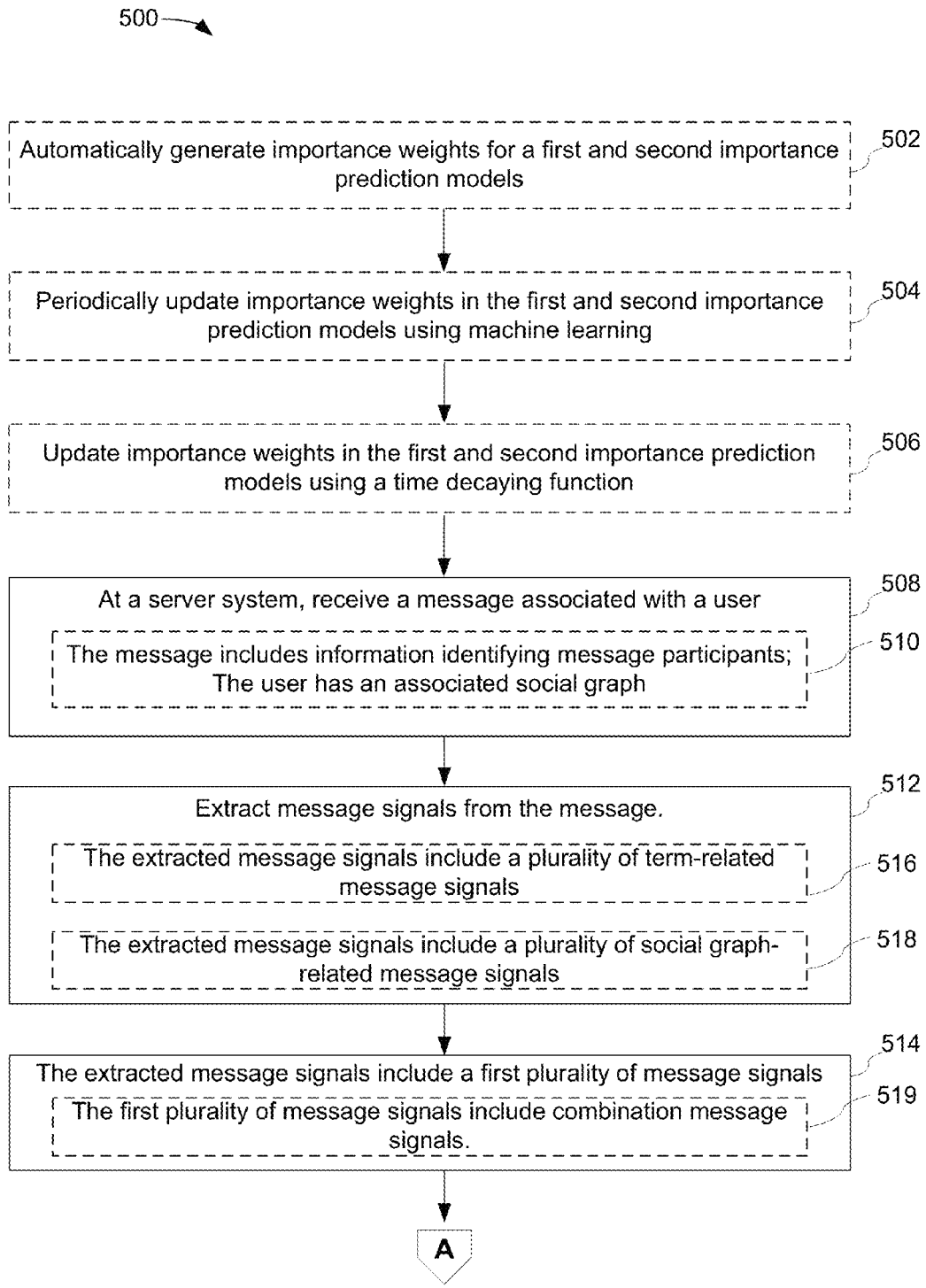
FIGS. 5A-5C are flowcharts representing a method for identifying important messages at a server, according to some embodiments.
Figure 5B:
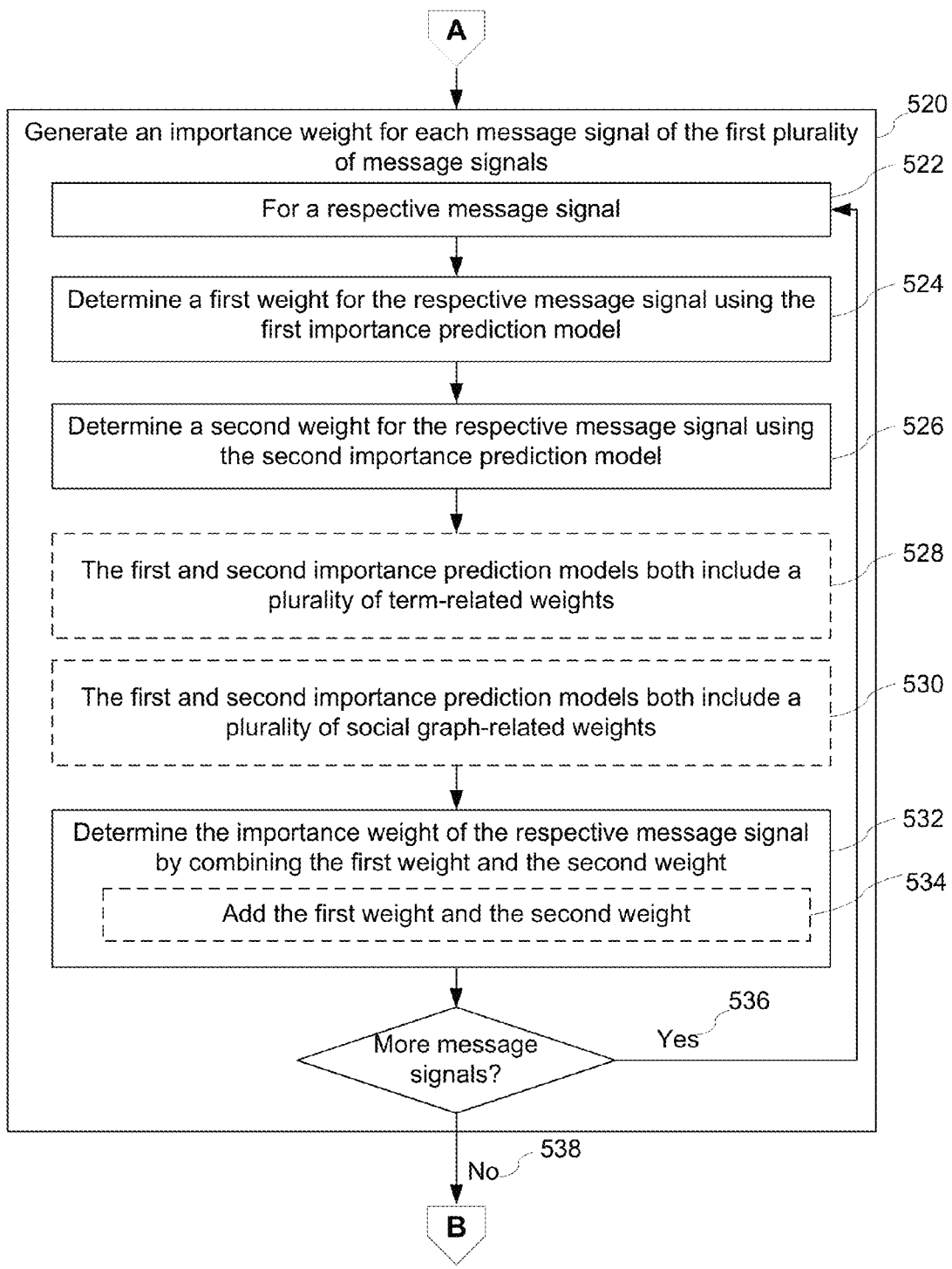
Figure 5C:
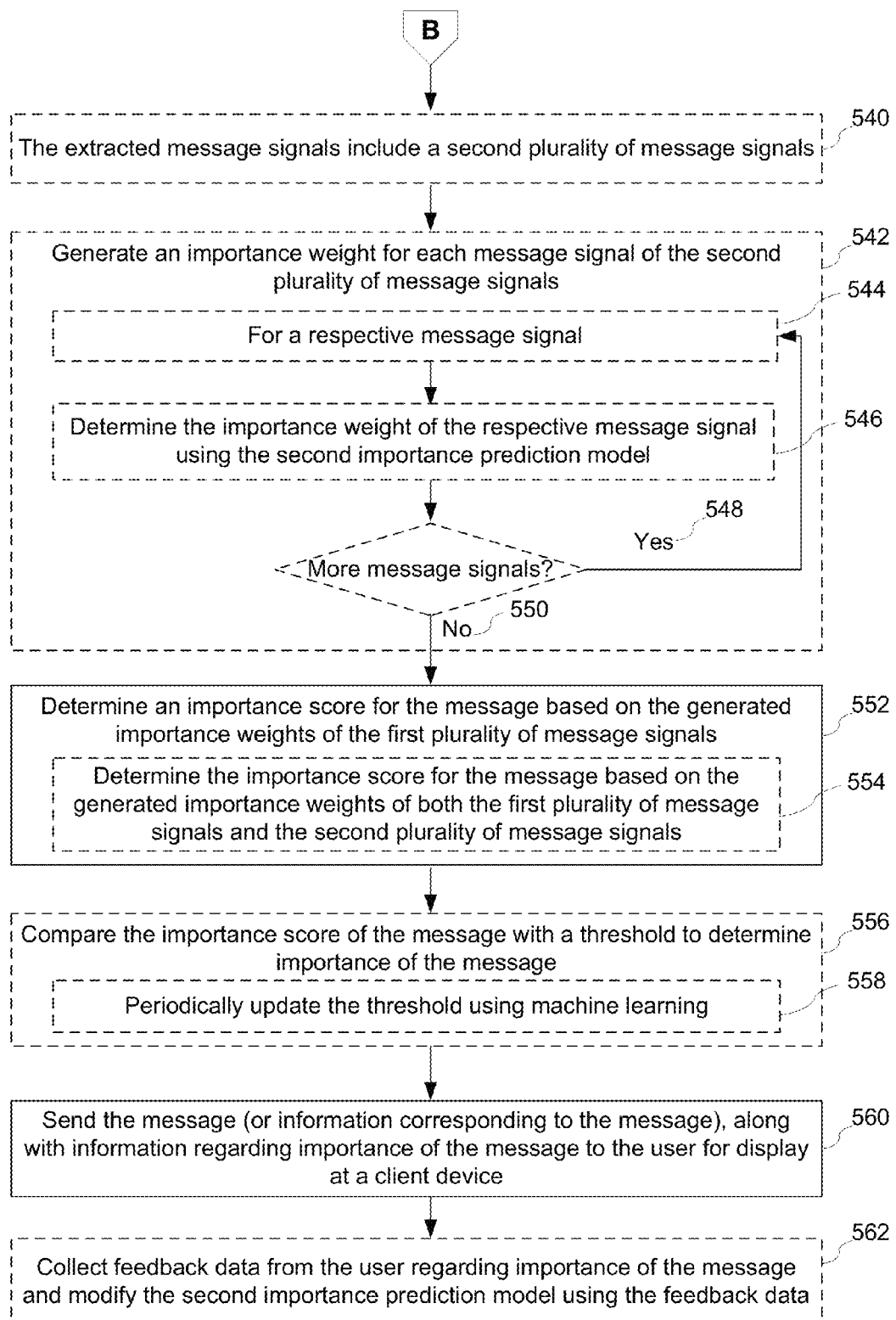

FIG. 5A-5C are flowcharts representing a server method 500 for identifying important messages, according to certain disclosed embodiments. Server method 500 may be governed by instructions that are stored in a computer readable storage medium and that are executed by one or more processors of one or more servers (see server system 106, FIG. 2). Each of the operations shown in FIG. 5 may correspond to instructions stored in a computer memory or computer readable storage medium (e.g., memory 206, FIG. 2). The computer readable storage medium may include a magnetic or optical disk storage device, solid state storage devices such as flash memory devices, or other non-volatile memory device or devices. The computer readable instructions stored on the computer readable storage medium are in source code, assembly language code, object code, or other instruction format that is interpreted by one or more processors.

In some embodiments, server system 106 (FIGS. 1, 2) automatically generates (502) the plurality of weights included in first and second importance prediction models (132, 134, FIG. 1B) using data from message database 126 and user account database 124, without requiring the user to provide explicit feedback regarding importance of any messages. Each of the plurality of weights in the first and second importance prediction models corresponds to a respective message signal. In some embodiments, a message signal in the first (global) importance prediction model is given a greater weight if the server determines the probability is high that a common user will act within a predetermined amount of time upon messages exhibiting the message signal. The term "exhibited" is defined as follows. A message signal extracted from a respective message is said to be exhibited by that message. For example, the server may find that a common user will more likely respond within 48 hours to a message where the user is the only recipient than to other messages where the user is not the only recipient. In this example, the message signal "User is the only recipient" is given a greater weight than the message signal "User is not the only recipient" in the global importance prediction model. In some embodiments, a message signal in the second (user) importance prediction model is given a greater weight if the server determines the probability is high that a specific user will act within a predetermined amount of time upon messages exhibiting the message signal. For example, the server may find that a specific user is likely respond within 48 hours to messages from a person named "John Doe," and a corresponding message signal is given a commensurate weight. More generally, a weight is assigned to each message signal that is included in an importance prediction model that is commensurate with its predictive power, e.g., for predicting the likelihood that messages exhibiting the message signal will be opened by the user within a predefined period of time after the signal has been received in the user account.

In some embodiments, server system 106 automatically generates and/or periodically updates (504) one or more of the importance weights in the first and second importance prediction models using machine learning. Machine learning includes a set of techniques, implemented using software tools and computer systems, that generate functions and predictive models (e.g., by determining weights to be applied to components of the functions or predictive models). Machine learning is well known to those skilled in the art and is therefore not described in detail in this document. In some embodiments, in order for the machine learning technique to adapt to changes in the activity in a user's messaging account (e.g., changes in the messages being received by a user, for example, a sudden influx of messages concerning events such as holidays, and/or changes in a user's behavior), the server creates a user profile that is independent of the importance prediction model for a respective user. The user profile tracks user behavior-related statistical data, such as the number of messages the user receives, reads or replies to per day, the percentage of messages read or replied to by the user per day and the number of messages marked as important by the user per day. When the user profile indicates that characteristics of the messages being received by the user deviate from those normally received by the user in the past, and/or indicates that the user's behavior with respect to received messages deviates from the user's normal behavior with respect to one or more statistical data by more than a predetermined amount, the machine learning technique will ignore any new user data in the learning process until either the deviation of received messages and/or user behavior ends, or the deviation of received messages and/or user behavior persists long enough so that it becomes the new normal with respect to received messages and/or user behavior.

Optionally, server system 106 updates (506) one or more of the importance weights in the first and second importance prediction models using a time-dependent decay function to discount over time the importance of user actions with respect to messages having a respective message signal. Thus, the influence of user actions (e.g., opening, replying, deleting) on messages exhibiting a message signal are discounted by an amount that corresponds to how long ago the user actions occurred. For example, in these embodiments, a user action that occurred two weeks ago (or perhaps two months ago) is more heavily discounted than a similar user action that occurred one day ago.

In some embodiments, server system 106 receives (508) a message associated with a user. The received message includes (510) information identifying message participants. Message participants include people listed in one or more of the To, From, and Cc fields of the message, and possibly in other fields as well (e.g., a Reply-To field, if provided). In some embodiments, message participants also include people listed in the To, From, Cc, . . . fields of other messages that are in the same conversation as the received message. In some embodiments, the user has (510) an associated social graph (326, FIG. 3B). In some circumstances, the user's social graph data 326 (FIG. 3B) includes information regarding one or more of the message participants. After receiving the message (508), server system 106 determines whether the message satisfies predefined message importance criteria. In some embodiments, server system 106 makes this determination using the methodology represented by FIGS. 5A-5C, as explain in more detail below. In some implementations, when a message is determined to satisfy the predefined message importance criteria, a predefined "important" label is applied to the message, thereby enabling a client device that receives the message to process the message differently from messages not labeled as important. Furthermore, in some implementations, a client device can be configured by the client device's user to receive only messages labeled as important, or only conversations having at least one message labeled as important, during automatic (e.g., periodic) synchronization operations.

In some embodiments, server system 106 extracts (512) one or more message signals from the message. In some embodiments, some of the message signals are extracted from the message header. Examples of message signals extracted from the message header include: a signal identifying whether the user is the only recipient of the message, a signal identifying whether the message is sent by the user, a signal identifying whether the subject of the message contains one or more words conveying importance (e.g., "important," "please read," "urgent," "action needed," "confidential" and "reminder"), a signal identifying whether the subject of the message contains the user's display name, one or more signals identifying the labels (if any) applied to the message, a signal identifying whether the message is addressed to the user using the Bcc field; a signal indicating if the message was sent to a list to which the user has subscribed; one or more signals indicating whether the message was sent from one or more particular domains (e.g., domains identified in a user profile as domains from which the user appears to receive important messages (or unimportant messages), based on prior user actions with respect to such messages); and one or more signals indicating whether the received message was sent during a correspond time-of-day range (e.g., 8 AM-5 PM, 5:01 PM-11 PM, or 11:01 PM-7:59 AM). The exampled given here are non-exhaustive; many other messages signals may be generated based on information extracted from the message.

In some embodiments, some of the message signals are extracted from the message body, i.e., the content of the message (excluding information in the message header, such as the sender, recipients, timestamps, and message subject). Examples of message signals extracted from the message content include: a signal identifying whether the content contains one or more words conveying importance, a signal identifying whether the content contains the user's display name.

In some embodiments, when generating an importance score for a received message, message signals are extracted from the context of the received message (also herein called the current message) within a thread that includes at least one earlier message. Examples of message signals extracted from the context of the message within a thread include: a signal indicating whether the thread is initiated by the user, a signal identifying whether the message is the first message in the thread, a signal identifying whether the user has replied to a message in the thread, and one or more time related signals, such as signals identifying how long an earlier message in the thread (i.e., a message received prior to the current message) has remained unread by the user, and/or how quickly the user first read or responded to an earlier message in the thread.

In some embodiments, the extracted message signals include (516) a plurality of term-related message signals. A term-related message signal corresponds to presence or quantity of important terms in the message, where important terms include terms determined to be indicative of message importance. Examples of important terms include "important," "please read," "urgent," "action needed," "confidential," "reminder," and the name of the respective user. Some important terms apply to multiple users, and some important terms only apply to a specific user. In some embodiments, the number of important terms (e.g., terms found in one or more lists of important terms) in a message (e.g., in the message body and/or message subject) are counted. In some embodiments, the count of important terms in a message includes important terms in the subject of the first message in a conversation but not in the subjects of other messages in the conversation, to avoid repetitively counting the same term. Optionally, the extracted message signals include multiple signals, each of which corresponds to a particular count or range of counts of important terms in the received message. For example, the extracted message signals may include: one important term; 2 important terms; 3 to 4 important terms; 5 or more important terms; and, one or more important terms in message subject. Optionally, the important term list for a respective user is updated periodically, or from time to time, based on recently received messages or based on messages received since the last time the important term list was generated or updated.

In some embodiments, the extracted message signals include (518) a plurality of social graph-related message signals. Examples of social graph-related message signals include: a signal identifying the percentage of messages the user reads from the sender of the message, a signal identifying the percentage of messages the user reads that have at least one of the same recipients as the received message, a signal identifying the percentage of messages that are read out of the total messages sent to exactly the same group of recipients, a signal identifying whether the sender of the message has a corresponding social graph weight associated with the user, a signal identifying the social graph weight of the sender. Social graph weight is described above with reference to FIG. 3B.

In some embodiments, the extracted message signals include (514) a first plurality of message signals. Optionally, each of the first plurality of message signals has corresponding importance weights in both the global importance prediction model and the user importance prediction model. For a respective message signal in the first plurality of message signals, its first (global) weight in the global importance prediction model is a baseline value of the importance weight of the message signal, while its second (user) weight in the user importance prediction model represents how much the user model deviates from the global model, in other words, the difference between the user model and the global model. For example, a respective message signal in the first plurality of message signals has a first weight equal to 0.5 in the global importance prediction model and a second weight equal to −0.2 in the user importance prediction model, where the difference between the global model and the user model for this respective message signal is quantitatively expressed as −0.2.

In some embodiments, the first plurality of message signals include (519) one or more combination message signals, where a combination message signal includes combination of two or more other message signals. In some embodiments, two or more message signals are combined using a logic function (e.g. AND, OR, XOR . . . ) to generate a combination message signal. Weights are generated for the generated combination message signal and used to help determine message importance. For example, the server extracts a first message signal "This message was from a very important person (VIP): True or False," and a second message signal "The message was sent by an automated system: True or False." The two message signals can be combined into one combination message signal using a logic AND function; for example, the combination message signal is determined to be True only when "the message is sent by a VIP" AND "the message is NOT sent by an automated system." It is advantageous to use combination message signals in cases where the combination message signal has been determined (e.g., through the use of machine learning) to have greater message importance predictive power than the combination's constituent message signals in isolation.

In some embodiments, server system 106 generates (520) an importance weight for each message signal of the first plurality of message signals. For a respective message signal (522), server system 106 determines (524) a first weight for the respective message signal using the first (global) importance prediction model. The server also determines (526) a second weight for the respective message signal using the second (user) importance prediction model.

In some embodiments, both the first and second importance prediction models include (528) a plurality of term-related weights, each corresponding to a term-related message signal. Term-related message signals are described in more detail above with reference to FIG. 5A.

In some embodiments, both the first and second importance prediction models include (530) a plurality of social graph-related weights, each corresponding to a social graph-related message signal. Social graph-related message signals are described in more detail above with reference to FIG. 5A.

In some embodiments, server system 106 determines (532) the importance weight of a respective message signal by combining the first and the second weights. In some embodiments, the importance weight of the respective message signal is determined (534) by adding the first weight and the second weight.

Operations 522 to 534, for determining the importance weight for a respective message signal, are repeated (536) for each message signal in the first plurality of message signals. In some embodiments, upon determining (538) that an importance weight has been generated for each and every message signal in the first plurality of message signals, server system 106 determines (552) an importance score for the message based on the generated importance weights of the first plurality of message signals. In some embodiments, the importance score of the message is determined by adding up the importance weights of each message signal in the first plurality of message signals.

In some embodiments, the extracted message signals further include (540) a second plurality of message signals. In some embodiments, each of the second plurality of message signals has corresponding importance weights in only the user importance prediction model but not the global importance prediction model. In these embodiments, the server generates (542) an importance weight for each message signal of the second plurality of message signals. For a respective message signal (544), server system 106 determines (546) the importance weight for the respective message signal using the second (user) importance prediction model but not the first (global) importance prediction model. These operations are repeated so as to determine the importance weight for each respective message signal in the second plurality of message signals (548).

Upon determining (550) that an importance weight has been generated for each and every message signal in the first and second pluralities of message signals, server system 106 determines (554) an importance score for the message based on the generated importance weights of the first and second pluralities of message signals. In some embodiments, the importance score of the message is determined by adding up the importance weights of each message signal in the first and second pluralities of message signals. In some embodiments, the server determines importance scores for the message and a plurality of other messages using the method described above and then orders the message and the plurality of other messages based on their importance scores.

In some embodiments, after determining an importance score for the message, server compares (556) the importance score of the message with a threshold to determine importance of the message. In some embodiments, messages with importance scores greater than the threshold (or, more generally, messages that satisfy predefined message importance criteria) are determined to be important. In some embodiments, messages with importance scores less than the threshold (or, more generally, messages that do not satisfy the predefined message importance criteria) are determined to be unimportant. In some embodiments, the threshold is predetermined by the server. In some embodiments, the server periodically updates (558) the threshold using machine learning. The requirement that messages determined to be important have an importance score greater than the threshold is an example of predefined message importance criteria.

In some embodiments, the server compares the importance score of the message with multiple thresholds to determine a level of importance for the message. For example, the server compares the importance score of the message with two thresholds T1 and T2, where T1 is less than T2. If the importance score of the message is greater than T2, the message is determined to be "Very Important;" if the importance score of the message is less than T2 but greater than T1, the message is determined to be "Important;" if the importance score of the message is less than T1, the message is determined to be "Unimportant." By comparing the importance score of multiple received messages with the multiple thresholds, each of the received messages is assigned an importance level and the messages are divided into tiers or levels of importance.

In some embodiments, the server sends (560) the message (or message information concerning the message) along with information regarding importance of the message to the user for display at a client device. In some embodiments, information regarding importance of the message includes instructions for displaying the message in a sub-region of a display window where the sub-region is used to display important messages, as described in greater detail below with reference to FIG. 6A, which depicts a "Priority Inbox" user interface of a messaging application. In some embodiments, information regarding importance of the message includes instructions for displaying a predefined label to denote importance of the message, as described in greater detail below with reference to FIG. 6A. As noted above, instead of sending the message itself along with the importance information, the server may send information corresponding to the message (e.g., the subject line of the message, information identifying the sender of the message, information identifying a subject of the conversation to which the message belong, etc.) along with the message importance information.

Figure 6A:
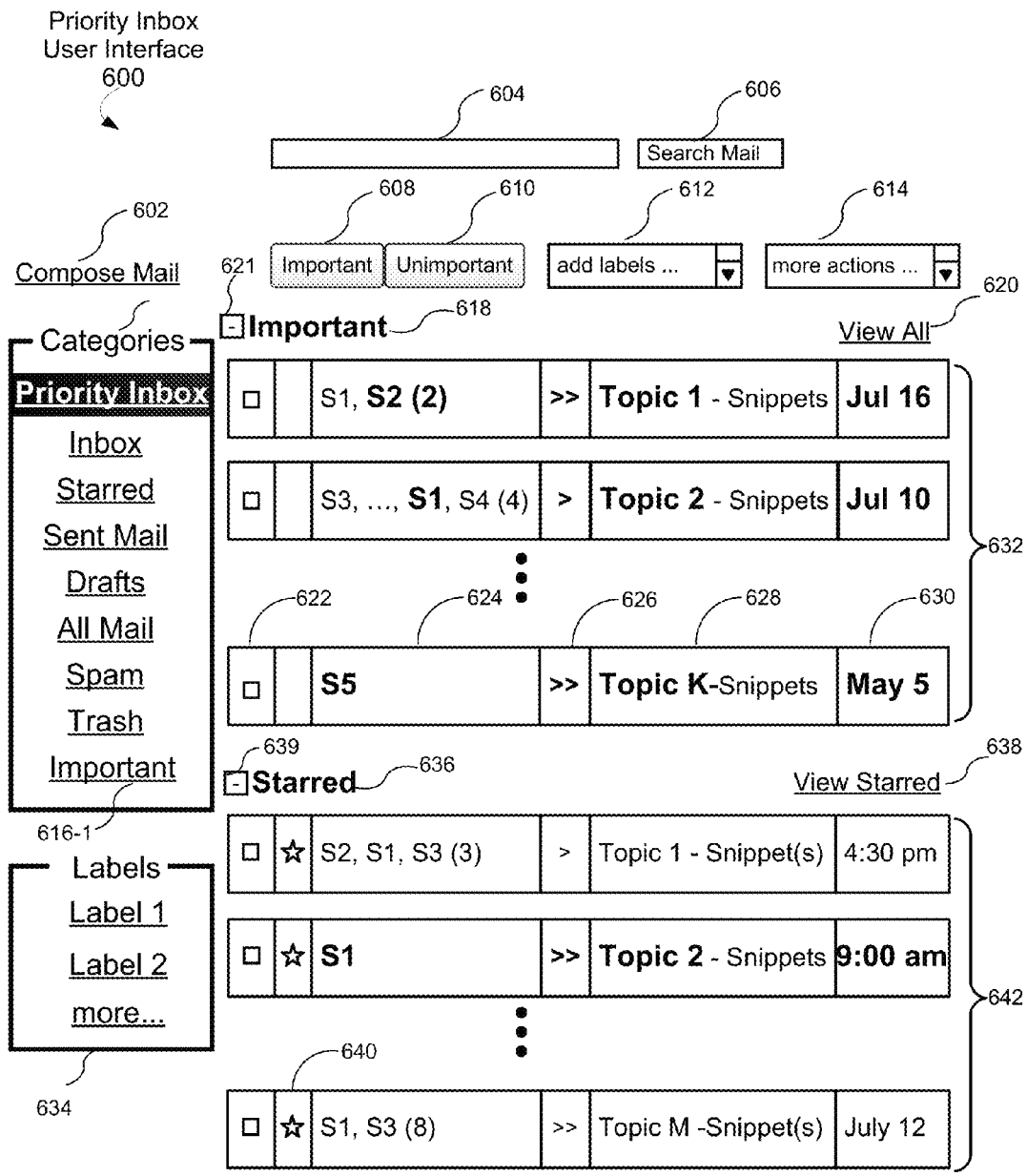
FIG. 6A is a schematic screenshot of a "Priority Inbox" user interface of a messaging application in which lists of conversations are displayed in two non-overlapping areas of the display, the two areas of the display including an "Important" link and a "Starred" link respectively, according to some embodiments.
Figure 6B:
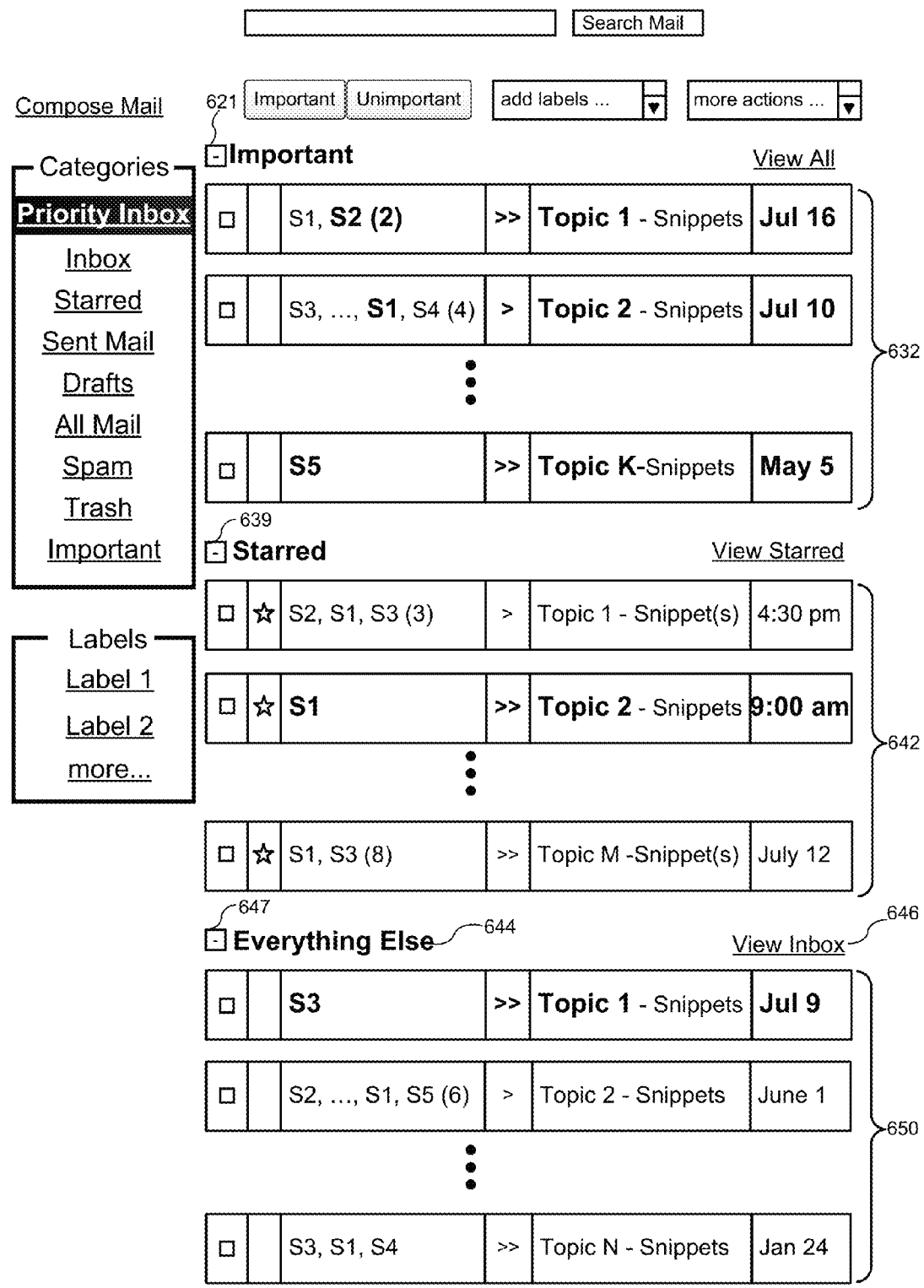
FIG. 6B is a schematic screenshot of a "Priority Inbox" user interface of a messaging application in which lists of conversations are displayed in three non-overlapping areas of the display, the three areas of the display including an "Important" link, a "Starred" link and an "Everything Else" link respectively, according to some embodiments.
Figure 6C:
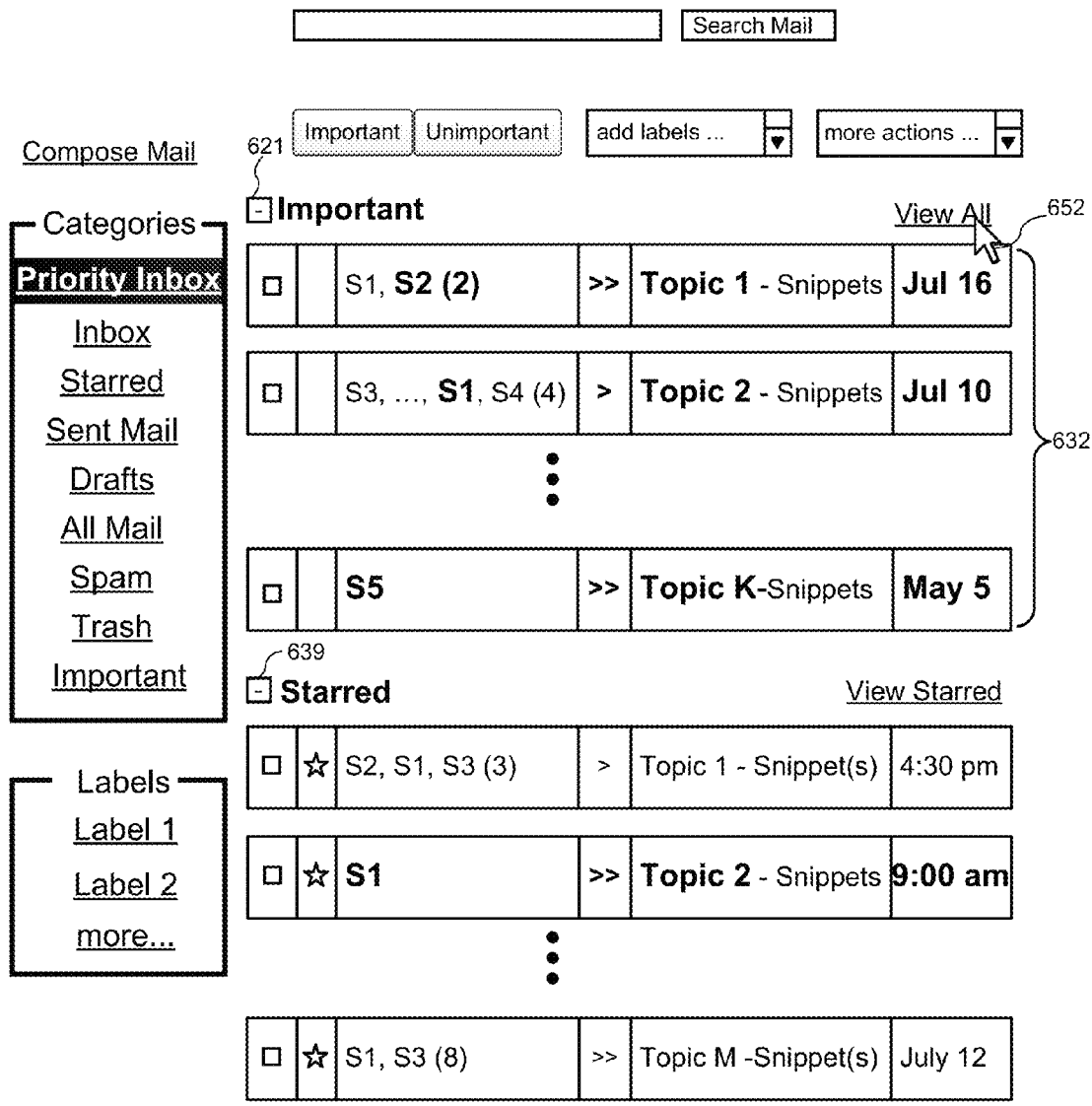
FIG. 6C is a schematic screenshot of a "Priority Inbox" user interface of a messaging application, depicting how a user expands the area (of the messaging application user interface) labeled "Important" by selecting a "View All" link, according to some embodiments.
Figure 6D:
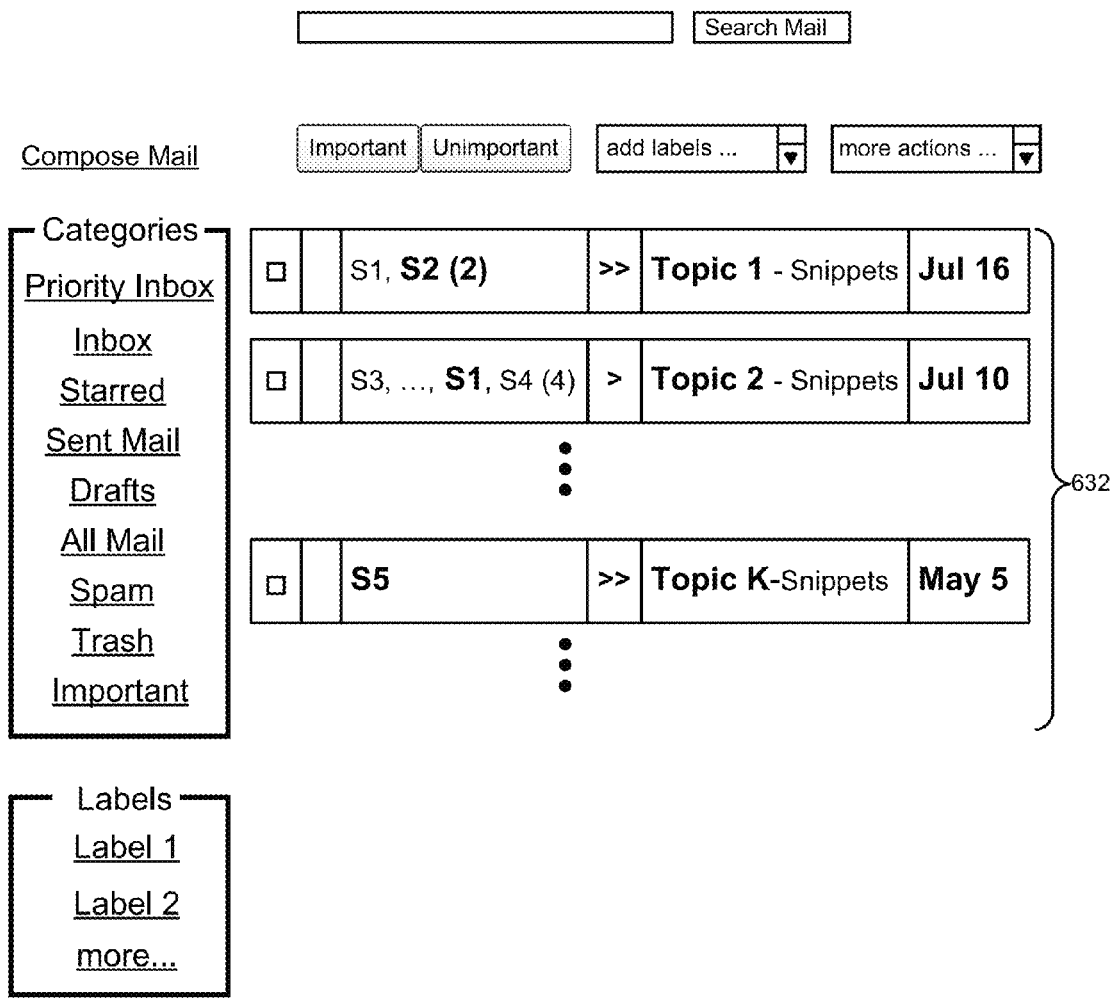
FIG. 6D is a schematic screenshot of the area (of a messaging application user interface) labeled "Important" in its expanded state, according to some embodiments.
Figure 6E:
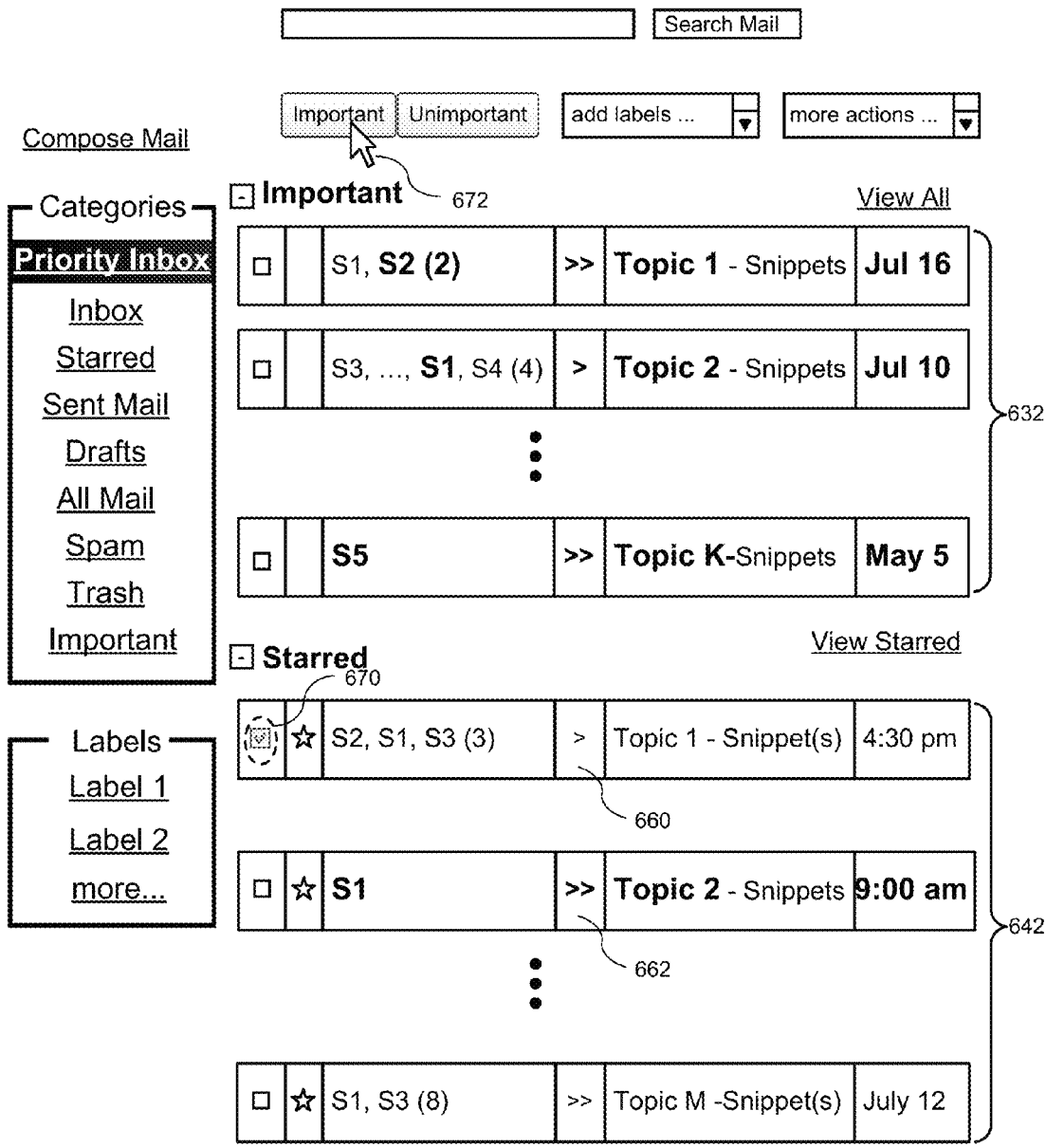
FIG. 6E is a schematic screen shot of a messaging application user interface, depicting how a user can mark an item as important by selecting the item and clicking on an "Important" button, according to some embodiments.
Figure 6F:
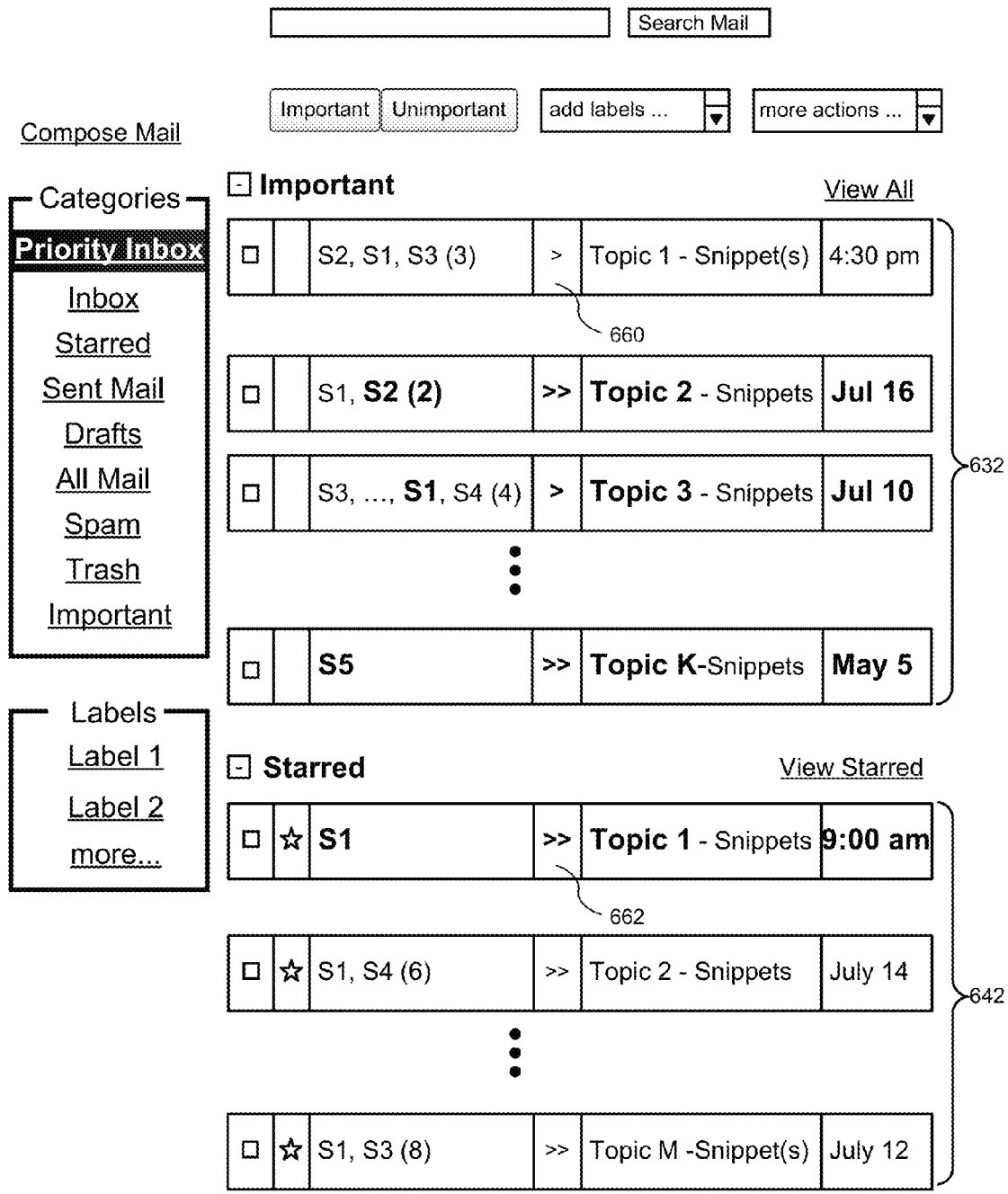
FIG. 6F is a schematic screen shot of a messaging application user interface, depicting an item being moved from the area "Starred" to the area "Important" after being marked as important by the user, according to some embodiments.

In some embodiment, after the server sends the message (or message information) along with information regarding importance of the message to the user for display, the user can optionally provide feedback data regarding importance of the message or any other messages, for example by marking one or more of the messages as "important" or "unimportant," as illustrated in FIGS. 6E-6F. In some embodiments, server system 106 collects (562) the optional feedback data from the user regarding importance of the message or any other messages, and incorporates the optional user feedback data in generating and/or updating (562) importance weights for the second (user) importance prediction model. In another embodiment, server system 106 collects (562) the optional feedback data from the user regarding importance of the message or any other messages, and incorporates the optional user feedback data in generating and/or updating importance weights for both the first (global) and second (user) importance prediction models, but the user feedback data is given lower weight for updating the global model than for updating the user model.

FIG. 6A is a schematic screenshot of a "Priority Inbox" user interface 600 of a messaging application in which lists of conversations are displayed in two non-overlapping areas of the user interface 600, according to some embodiments. At the top left corner of the screenshot, there is a "Compose Mail" link 602. The user clicks on link 602 to start writing a new message. Nearby link 602, there are a textbox 604 and a "Search Mail" button 606. After the user submits one or more query terms through textbox 604 and clicks on the "Search Mail" button 606, the system generates a new display listing messages or conversations matching the query terms. Nearby textbox 604 are two importance marking affordances (sometimes called buttons, or user interface buttons), "Important" 608 and "Unimportant" 610. The user selects one of the two affordances to mark a message or conversation as important or unimportant, which will be described in more detail below with reference to FIGS. 6E-6F. Next to the "Important" and "Unimportant" affordances are two pull-down lists: "add label" list 612 and "more actions" list 614. Right below the "Compose Mail" link 602, there are a series of group boxes, each box corresponding to a system-defined category, represented by a respective system-defined label such as "Priority Inbox," "Inbox," "Starred," "Sent Mail," "Drafts," "All Mail," "Spam," "Trash," "Important," etc. In some embodiments, the set of system-defined categories may be different, including a subset of these categories and/or additional categories. Below "Categories" group boxes 616, there are another series of group boxes, each box corresponding to a user-defined category represented by a respective user-defined label such as Label 1, Label 2 . . . , etc. Note that since the current screenshot displays only conversations belonging to the "Priority Inbox" category, the corresponding link in group boxes 616 has been highlighted.

In some embodiments, the "Priority Inbox" category includes messages and conversations organized and displayed according to importance of the respective message or conversation, as described in more detail below with reference to FIGS. 6A-6F. In some embodiments, the "Starred" category includes messages and conversations in which the user plans to be actively involved, e.g., by sending messages to other participants, which is similar to a "To Do" list. Thus, in some embodiment, a message may be flagged with a predefined label such as a star 640, so that a user can search for starred messages. In some embodiments, the "Important" category 616-1 includes messages and conversations that have been determined to meet predefined message importance criteria. The predefined message importance criteria are described in more detail above with reference to FIG. 5C.

Next to "Categories" group box 616 and below the row of buttons 608, 610 and drop down boxes 612, 614 there is message area of the user interface, which is used to display message information (e.g., a list of conversations matching a query, or the messages in a conversation), representing a set of messages. Typically, the message information is for messages to and from the message account of a respective user. Typically, the displayed message information includes or concerns messages in which the respective user is a participant (e.g., specified in the To, Cc, or Bcc field of each message). In some embodiments, the displayed messages are (or include) email messages. Optionally, the displayed message information includes or concerns two or more types of messages, such as two or more of: email messages, chat messages, SMS messages, voice messages, and video messages.

In some embodiments, the message area concurrently displays message information for a first set of messages 632 in a first area of the user interface, and message information for a second set of messages in a second area of the user interface that is separate from the first area. As shown in FIG. 6A, in some embodiments, the first area in the message area includes a heading 618 (e.g., "Important") to identify the messages displayed in the first area. Heading 618 is displayed at the top left corner of the first area. Optionally, heading 618 is also a link 618 that, when selected by a user, provides the user with options for determining which messages are to be displayed in the first area of the user interface, and more generally for configuring that area of the user interface. Similarly, the heading for each additional message area (e.g., heading 636 above the second area and heading 644 above the third area) is also a link that, when selected by a user, provides the user with options for determining which messages are to be displayed in that area of the user interface, and more generally for configuring that area of the user interface.

Below heading 618 is a list of messages or conversations 632 each occupying one row in the first area. Each conversation/message displayed in the first area meets predefined message importance criteria, and each conversation displayed in the first area has at least one message meeting the predefined message importance criteria. The predefined message importance criteria are described in more detail above with reference to FIG. 5C. It should be noted that it is advantageous to display only messages that have been determined to meet the predefined importance criteria in the first area because it enables the user to quickly and conveniently locate messages that have been determined to be important, without having to browse multiple pages of messages to locate important messages on each page.

In some embodiments, each row in the first area includes a checkbox 622, and information for one conversation, including: a sender list 624, a recipient status indicator 626, a message/conversation topic and snippet of the message/conversation 628 and a date/time value 630 (e.g., the date/time of receipt of the last message in the listed conversation). Additional information about each of these fields can be found in U.S. Pat. No. 7,584,426 (see, for example, description of FIG. 3B), which is hereby incorporated by reference in its entirety. In some embodiments, the set of fields displayed may be different, including a subset of the aforementioned fields and/or additional fields. In some embodiments, checkbox 622 is checked by the user if the user decides to move the corresponding message or conversation from one system-defined category, e.g., "Inbox", to another one, e.g., "Trash", or if the user decides to attach a user-defined label to the corresponding conversation, or if the user decides to move the corresponding message or conversation from one area of the display to another one. At the top right corner of the first area, there is a "View All" link 620 (also called an expansion affordance), which is described in greater detail below with reference to FIGS. 6C-6D. Optionally, the "Priority Inbox" user interface 600 of the messaging application also includes a collapse affordance 621 for collapsing the first area and thereby removing items previously listed in the first area from being displayed the user interface. Optionally, each of the distinct message areas of the "Priority Inbox" user interface 600 includes a respective collapse affordance (e.g., collapse affordances 621 and 639 in FIG. 6A, and 621, 639 and 647 in FIG. 6B) for collapsing the corresponding area of the user interface and thereby removing items previously listed in the respective area from being displayed the user interface.

In some embodiments, the list of messages and conversations 632 is displayed in chronological order in the first area. In some embodiments, messages that have been received most recently are displayed above messages that have been received earlier. It is advantageous to display the list of important messages 632 in chronological order because chronological order makes the most intuitive sense to many users; some users may be confused if conversations or messages are not displayed in chronological order.

In some embodiments, messages and conversations that have not been read by the user are highlighted. In some embodiments, all messages in the list of important messages 632 are unread by the user, and all conversations in list 632 have at least one message that is unread by the user. It is advantageous to display only unread messages that have been determined to meet the predefined importance criteria in the first area because it enables the user to quickly and conveniently locate unread messages that have been determined to be important, which in many cases are among the most important messages to the user. Optionally, the user is given the option of displaying important conversations/messages in the list 632, without regard to whether the user has read all the messages in the list 632.

In some embodiments, the message area of the display window in FIG. 6A further includes a second area with a heading 636 (e.g., "Starred") displayed at the top left corner of the second area. Below heading 636 is a list of conversations 642 each occupying one row in the second area. Each conversation in list 642 has at least one message flagged by the user with the predefined label. Alternatively, in embodiments that show a list of messages instead of a list of conversations, each message in list 642 would be a message flagged by the user with the predefined label. In some embodiments, a star symbol 640 is displayed next to the conversation/message checkbox for each conversation/message in list 642. At the top right corner of the second area, there is a "View Starred" link 638 (also called an expansion affordance), which is described in greater detail below with reference to FIGS. 6C-6D. In some embodiments, the list of messages and conversations 642 is displayed in chronological order in the second area. In some embodiments, each of the conversations/messages in list 632 of the first area is excluded from list 642 of the second area. In some embodiments, no conversation/message in list 642 meets the predefined message importance criteria. As applied to lists of conversations, this means that no conversation in list 642 contains a message that meets the predefined message importance criteria.

As shown in FIG. 6B, in some embodiments, the message area of the message application's user interface further includes a third area for displaying a third set of messages. In most, if not all, embodiments, messages in the first set of messages and messages in the second set of messages are excluded from the third set of messages displayed in the third area. In this example, the third area includes a heading 644 (e.g., "Everything else") displayed at the top left corner of the third area. Below heading 644 is a list 650 of conversations or messages, each occupying one row in the third area. At the top right corner of the third area, there is a "View Inbox" link 646 (also called an expansion affordance) as described in greater detail below with reference to FIGS. 6C-6D. In some embodiments, the list 650 of conversations/messages is displayed in chronological order in the third area. In some embodiments, each of the conversations/messages in list 632 of the first area and list 642 of the second area is excluded from list 650 of the third area. In yet other embodiments, the user interface includes four distinct message areas (not shown), each for displaying a distinct set of conversations/messages. Optionally, the user can configure the user interface to determine the content of each message area. Optionally, the user can configure one of these areas to including only messages having a particular user-defined label (e.g., messages having the user-defined label "vacation"). Stated another say, the client device selects, for display in the respective area of the user interface, only messages (or conversations having at least one message) labeled with the particular user-defined label.

Though not shown, in some embodiments, each of the first, second and third areas in FIG. 6B includes a clickable drop-down header that allows a user to customize the way messages are displayed in a respective area and/or apply actions to all visible messages displayed in a respective area. In one embodiment, such a clickable drop-down header is attached to link "Important" 618, link "Starred" 636 and link "Everything Else" 644 respectively. The clickable drop-down header includes options that enable a user to customize the size of a respective area, the category of a respective area, etc. Optionally, the clickable drop-down header includes options that enable the user to select or deselect all visible messages in a respective area, or apply other actions to all visible messages in a respective area.

FIG. 6C is a schematic screenshot of a "Priority Inbox" user interface of a messaging application, depicting how a user expands the first area of the messaging application user interface by selecting the "View All" link (also called an expansion affordance), according to some embodiments. If a user wants to view only the messages and conversations in list 632 of the first area, the user can click (652) on the "View All" link located at the top right corner of the first area to expand the first area. The user interface schematically depicted in FIG. 6C will then change to the user interface schematically depicted in FIG. 6D, which depicts the first area in its expanded state. As shown in FIG. 6D, after the user clicks on the "View All" link to expand the first area, only conversations/messages in list 632 are displayed in the message area of the display window. In some embodiments, list 632 includes more conversations/messages than the maximum number of messages that can be displayed in the first area in FIG. 6C, but after the user expands the first area by clicking on the "View All" link, additional conversations/messages from list 632 that are not displayed in the first area in FIG. 6C can be displayed in the message area in FIG. 6D. In analogous manner, the user can click on the "View Starred" link 638 (FIG. 6A) to expand the second area, or click on the "View Inbox" link 646 (FIG. 6B) to expand the third area.

Though not shown, in some embodiments, each of the first, second, and third areas in FIG. 6B includes a collapse affordance 621, 639, 647 (also called a display area collapse link) that allows a user to collapse a respective display area of the user interface. In one embodiment, a respective collapse affordance is displayed above and near the left margin of the corresponding display area. When a user clicks on the collapse affordance of a respective area, the respective area is collapsed. In some embodiments, the respective area in its collapsed state only shows a header with the title of the respective area and a count of messages included in the respective area.

FIG. 6E is a schematic screenshot of a messaging application user interface, depicting how a user can mark an item displayed in the second area as important by selecting the item and clicking on the "Important" button (also called an importance marking affordance), according to some embodiments. If a user wants to mark a message or conversation in the second area (e.g., conversation 660 in FIG. 6E) as important, the user can select (670) the checkbox of conversation 660 and click (672) the button "Important." The screenshot in FIG. 6E will then change to the screenshot in FIG. 6F, where conversation 660 is moved from the second area to the first area and is included in the list 632 of the first area. Accordingly, in this example, conversation 662 is moved from the second message in list 642 (as shown in FIG. 6E) to the first message in list 642 (as shown in FIG. 6F).

Figure 7A:
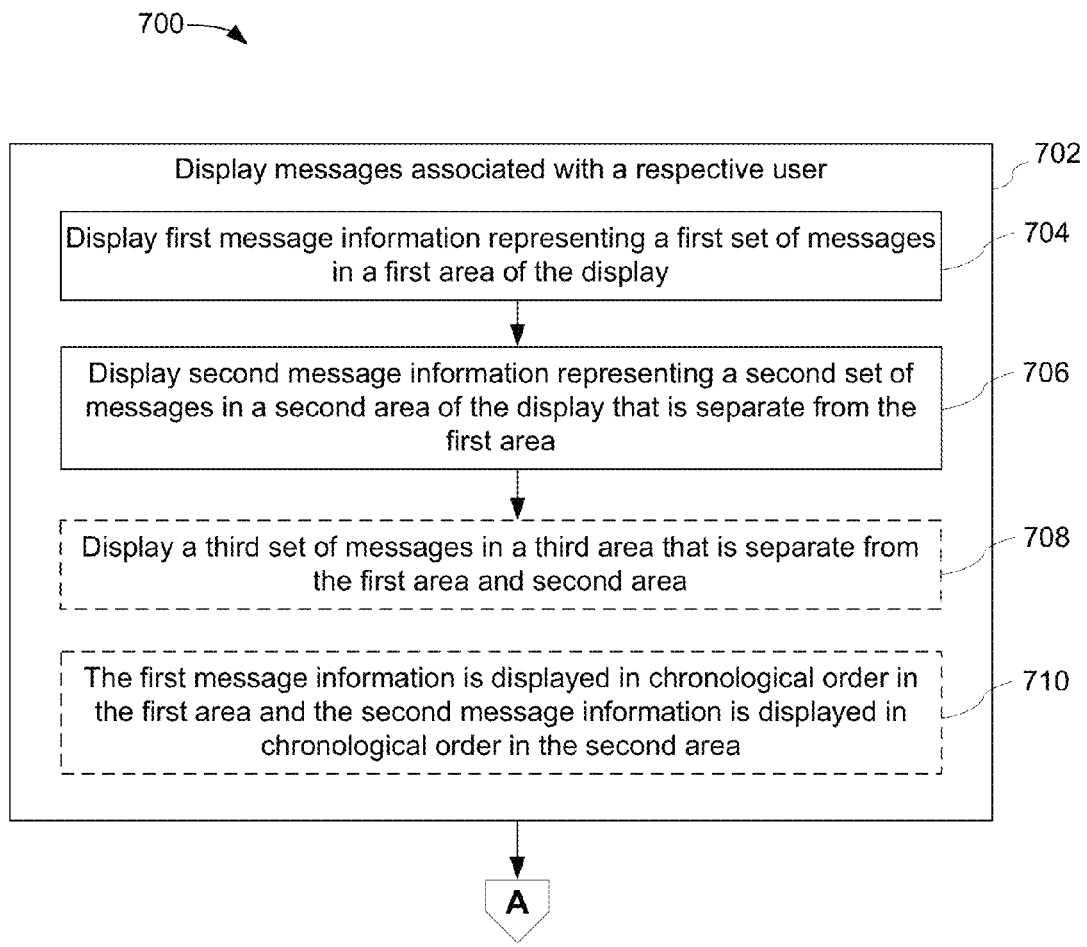
FIG. 7A is a flow chart representing a method for displaying messages associated with a respective user, according to some embodiments.

FIG. 7A is a flow chart representing a method 700 for displaying (702) messages associated with a respective user, according to some embodiments. A client system (e.g., client system 102, FIGS. 1A and 4) displays (704) first message information representing a first set of messages in a first area of the display and displays (706) second message information representing a second set of messages in a second area of the display that is separate from the first area (see, for example, the areas occupied by lists 632 and 642, FIG. 6A). In some embodiments, client system 102 further displays (708) a third set of messages in a third area that is separate from the first and second areas (see, for example, the areas occupied by lists 632, 642 and 650, FIG. 6B). In some embodiments, both the first message information and the second message information are displayed (710) by client system 102 in chronological order in their respective display areas. Details of method 700 are described above with reference to FIGS. 6A-6F.

Figure 7B:
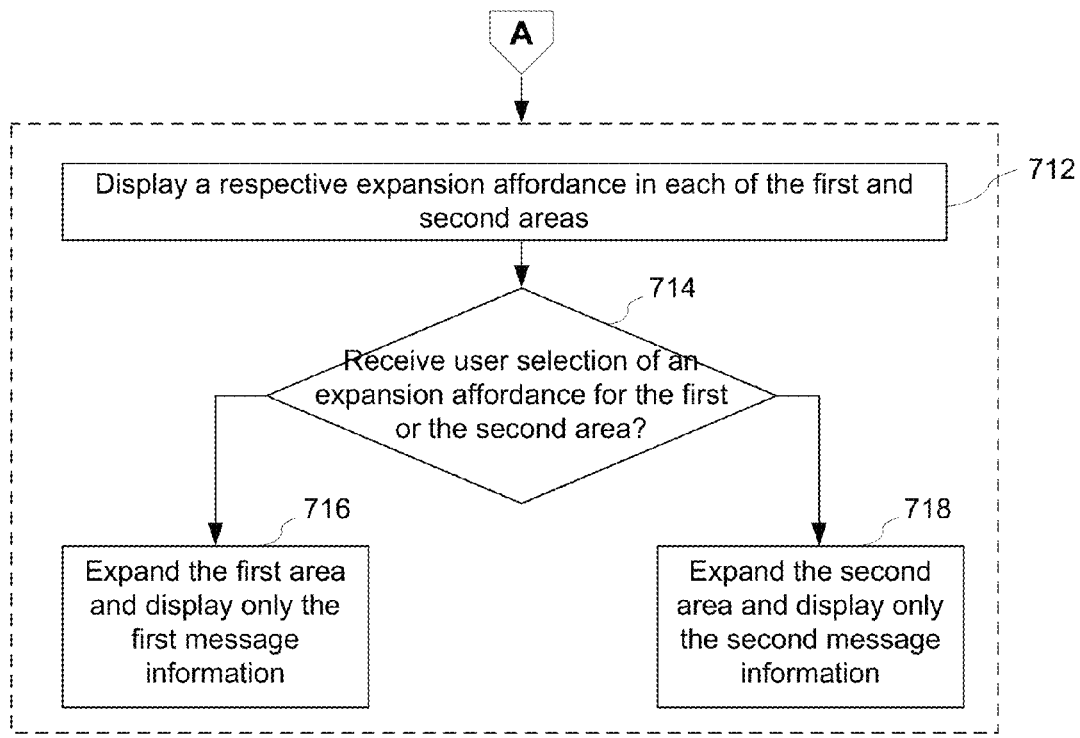
FIG. 7B is a flow chart illustrating the operation of an expansion affordance, according to some embodiments.

FIG. 7B is a flow chart illustrating the operation of an expansion affordance, according to some embodiments. Client system 102 system displays (712) a respective expansion affordance (e.g., 620, 638, FIG. 6A) in each of the first and second areas. In some embodiments, client system 102 receives (714) a user selection of the expansion affordance for the first area, and expands (716) the first area and displays only the first message information. In another embodiment, client system 102 receives (714) a user selection of the expansion affordance for the second area, and expands (718) the second area and displays only the second message information. Details of the method are described above with reference to FIGS. 6C-6D.

Figure 7C:
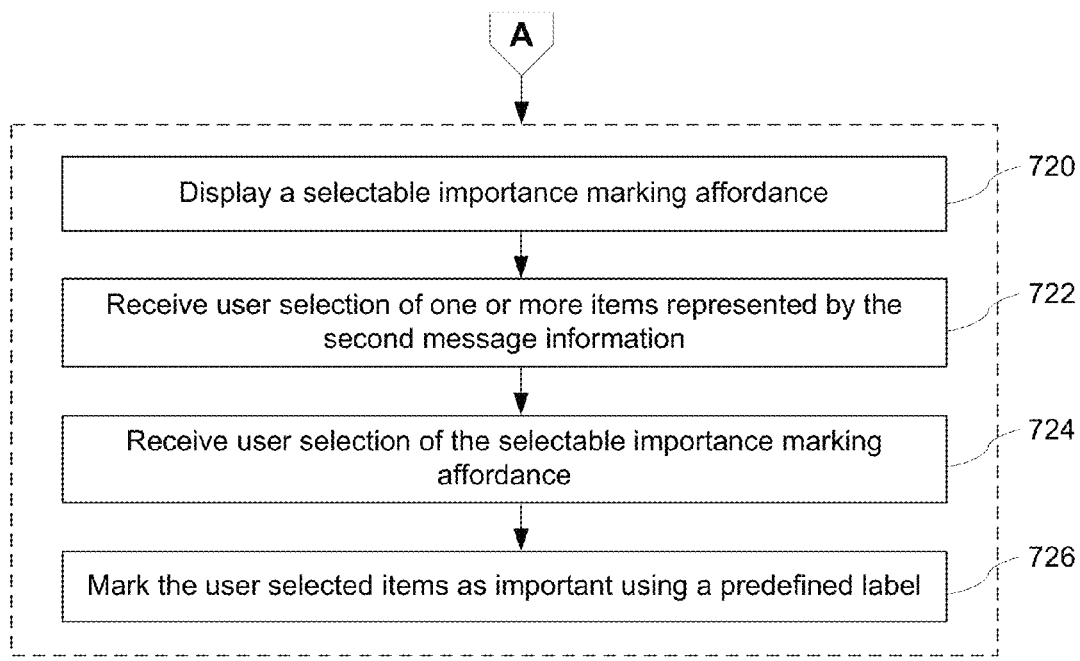
FIG. 7C is a flow chart illustrating the operation of an importance marking affordance, according to some embodiments.

FIG. 7C is a flow chart illustrating the operation of an importance marking affordance, according to some embodiments. The system displays (720) a selectable importance marking affordance. For example, FIG. 6A shows two selectable importance marking affordances, the Important 608 and Not Important 610 marking affordances. In some embodiments, the system receives (722) a user selection of one or more items represented by the second message information and receives (724) a user selection of the selectable importance marking affordance. The system then marks (726) the user selected items as important using a predefined label. Details of the method are described above with reference to FIGS. 6E-6F. The user action of marking selected items as important, or as not important, provides user-generated feedback data regarding importance of one or more user-selected messages. Optionally, the server (106, FIG. 2) collects feedback data from the user regarding importance of one or more messages, and modifies the second importance prediction model using the feedback data. Optionally, the server periodically (or from time to time) updates one or more of the importance weights in the first and second importance prediction models using machine-learning that is based, at least in part, on the feedback data. Optionally, the server updates one or more of the importance weights in the first and second importance prediction models using a time-dependent decay function that is applied to the feedback data and optionally to information concerning other user actions on messages. Optionally, the server also updates one or more importance thresholds based, at least in part, on the feedback data, so as to adjust the volume of conversations/messages classified as important and displayed in the message display area (e.g., see FIG. 6A) for important conversations/messages.

Figure 8A:
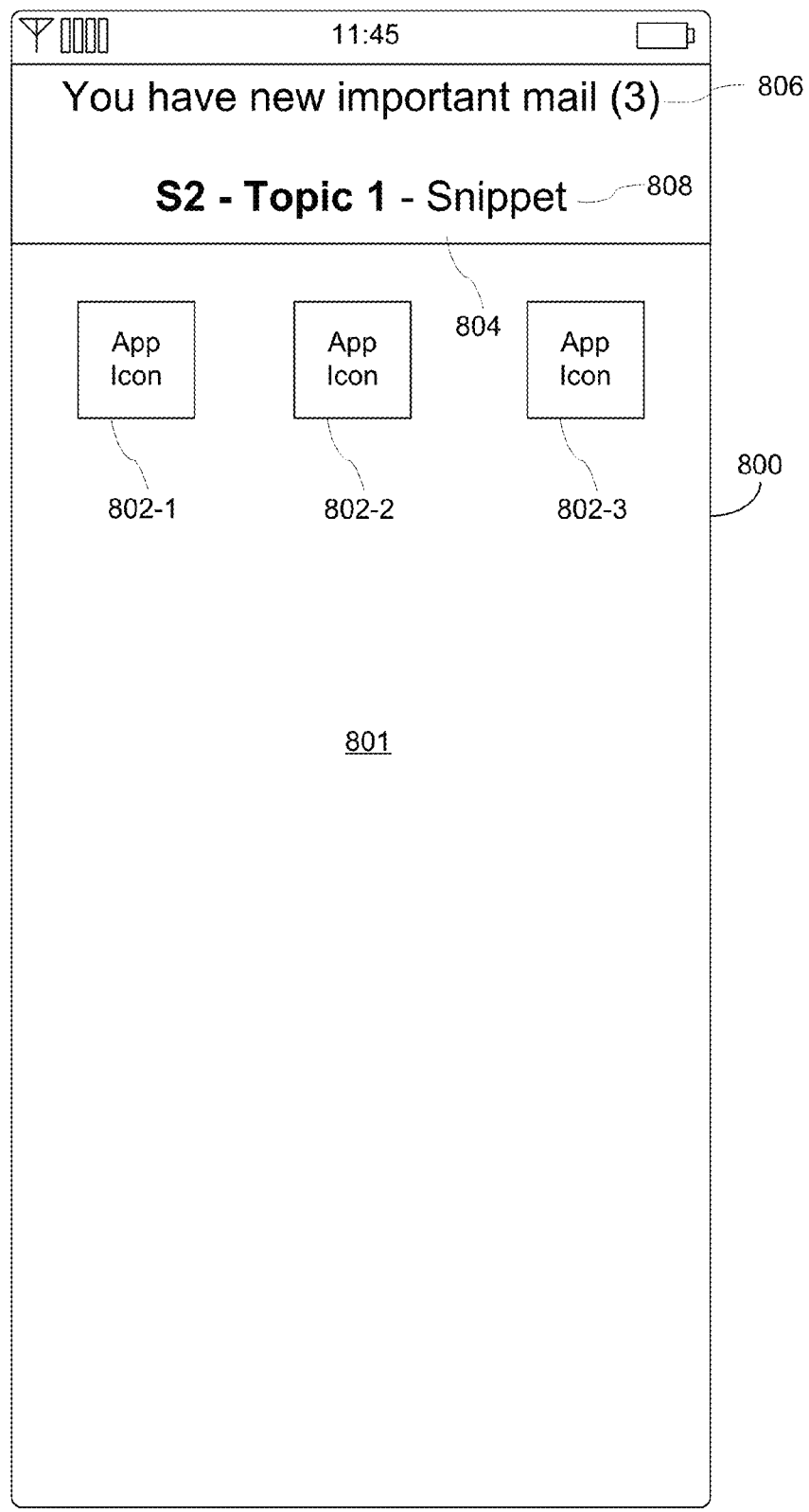
FIG. 8A is a schematic screenshot of a home menu on a mobile device with a new mail notification displayed, according to some embodiments.

FIG. 8A is a schematic screenshot of a home menu 801 displayed on a mobile device (e.g., mobile client device 102-c, FIG. 1A), in accordance with some embodiments. Home menu 801 is displayed on a display 800 of client device 102-c; display 800 is a part of the user interface 410 of mobile client device 102-c (FIG. 1A). In some embodiments, display 800 is a touch-sensitive display (or "touch screen"). One or more application icons 802 may be displayed on the home menu 801. An application icon 802 corresponds to a respective application on mobile client device 102-c. Touching the display 800 at a location corresponding to the location of an application icon 802 opens the corresponding application. In some embodiments, mobile client device 102-c includes a messaging application (e.g., an email application) or a web browser application rendering a messaging application web interface (e.g., a web email interface).

Also displayed in home menu 801 is a new email notification 804. New email notification 804 includes a message that there is new important mail. In some embodiments, new mail notification 804 shows a count 806 of new messages, as well as brief information 808 (e.g., sender, subject, and a snippet of the message) for one or more of the new messages.

New mail notification 804 notifies the user of new important messages. In some implementations, "new" messages are messages that are unread. In some embodiments, new mail notification 804 is displayed when new messages are received from server system 106 (e.g., new messages received as a result of a synchronization operation (also called a synch operation or a syncing operation) with server system 106) while a messaging application or a messaging application web interface is not running in the foreground on device 102-c (e.g., the messaging application is not running at all, or the messaging application is running in the background). In some embodiments, the user may perform a gesture (e.g., a tap gesture) on the new mail notification 804 to open the messaging application or messaging application web interface in order to view the new messages.

In some embodiments, a new mail notification (e.g., new mail notification 804) is displayed when the received new messages include one or more priority messages, but a new mail notification is not displayed when the received new messages do not include any priority messages. In some embodiments, "priority" messages are those messages that have been determined to meet predefined message importance criteria, which are described in more detail above with reference to FIGS. 5A-5C. For example, the "priority" messages are those messages whose importance scores are above a threshold value. In some embodiments, the new mail notification displays information for only the newly received priority messages. For example, new mail notification 804 displays a count 806 of only the newly received priority ("important") messages and information 808 for one or more of the newly received priority messages. Alternatively, new mail notification 804 displays a count 806 of all unread priority ("important") messages and information 808 for one or more of the newly received priority messages.

It should be noted that it is advantageous to display a new mail notification (e.g., new mail notification 804) when the received new messages include at least one priority message, but not display any new mail notification when the received new messages do not include any priority message; by notifying the user of new priority messages but not new non-priority messages, the user can focus attention on messages that are important and need more immediate attention and reduce unnecessary interaction with client mobile device 102-c. The reduction of unnecessary interaction with client mobile device 102-c can help reduce data usage (and thus reduce data usage fees) and preserve battery life.

Figure 8B:
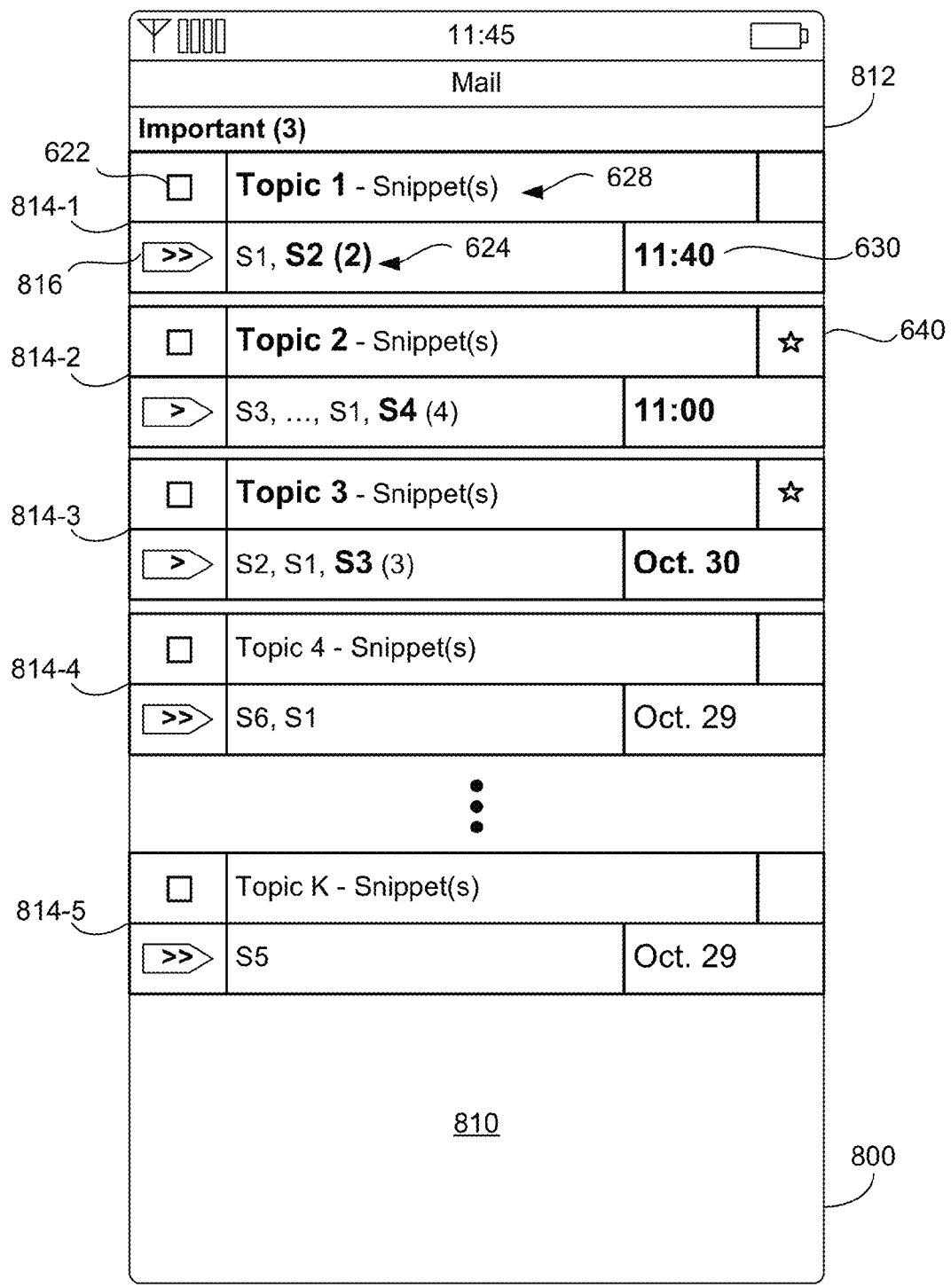
FIG. 8B is a schematic screenshot of a "Priority Inbox" user interface of a messaging application on a mobile device, in which priority messages or conversations that include at least one priority message may be displayed, according to some embodiments.

FIG. 8B is a schematic screenshot of a "Priority Inbox" user interface 810 of a messaging application on a mobile device, in which priority messages or conversations that include at least one priority message may be displayed, according to some embodiments. User interface 810 is displayed on display 800 of mobile device 102-c. User interface 810 includes a heading 812 indicating that user interface 810 is an interface for viewing priority messages. In some embodiments, heading 812 also shows a count of new (i.e., unread) priority messages. For example, heading 812 has a "(3)" displayed near the heading "Important," indicating that there are three (3) unread priority messages. As with heading 618, 636, or 644, heading 812 is also a link that, when selected by a user, provides the user with options for determining which messages are to be displayed in the first area of the user interface, and more generally for configuring that area of the user interface. For example, a user may select heading 812 to change user interface 810 to a user interface that displays both priority messages (and conversations that include one or more priority messages) and non-priority messages (and conversations that do not include any priority messages).

Zero or more priority messages or conversations that include at least one priority message (hereinafter "priority conversations" for convenience) 814 are displayed in user interface 810. A user may select a priority message/conversation 814 to read the selected message or messages in the selected conversation. In some embodiments, if there are no priority messages/conversations to display (e.g., because all priority messages received to date have been deleted or marked as trash), then user interface 810 may be displayed with no messages.

In some embodiments, each priority message/conversation is displayed with a checkbox 622 and one or more fields, including: a sender list 624, a recipient status and importance indicator 816, a message/conversation topic and snippet of the message/conversation 628, and a date/time value 630 (e.g., the date/time of receipt of the last message in the listed conversation). Recipient status and importance indicator 628 is a combination of recipient status indicator 626 and a graphical indicator (e.g., a pentagonal polygon as shown in FIG. 8B) that the message/conversation is a priority message/conversation. In some embodiments, if a priority message is unread or a priority conversation includes an unread message, the corresponding topic in topic/snippet 628 and the sender of the unread message in the senders list 624 are displayed in boldface or otherwise highlighted. In some embodiments, the set of fields displayed may be different, including a subset of the aforementioned fields and/or additional fields.

In some embodiments, priority messages/conversations 814 that are flagged with a predefined label (e.g., a star) are displayed in user interface 810 with the predefined label (e.g., star 640, FIG. 6A) displayed with the message/conversation. In some embodiments, any other predefined or user-defined labeled with which a priority message/conversation 814 is flagged are displayed with the corresponding message/conversation.

In some embodiments, checkbox 622 is checked by the user if the user decides to move the corresponding message or conversation from one system-defined category, e.g., "Inbox", to another one, e.g., "Trash", or if the user decides to attach a user-defined or predefined label to the corresponding conversation, or if the user decides to move the corresponding message or conversation from one area of the display to another one.

It should be apparent to one of ordinary skill in the art that user interface 810 is, in many ways, similar to the Priority Inbox user interface described with reference to FIGS. 6A-6F, but adapted to a smaller display 800 of a mobile device. For example, some affordances are not displayed without additional user input.

Figure 8C:
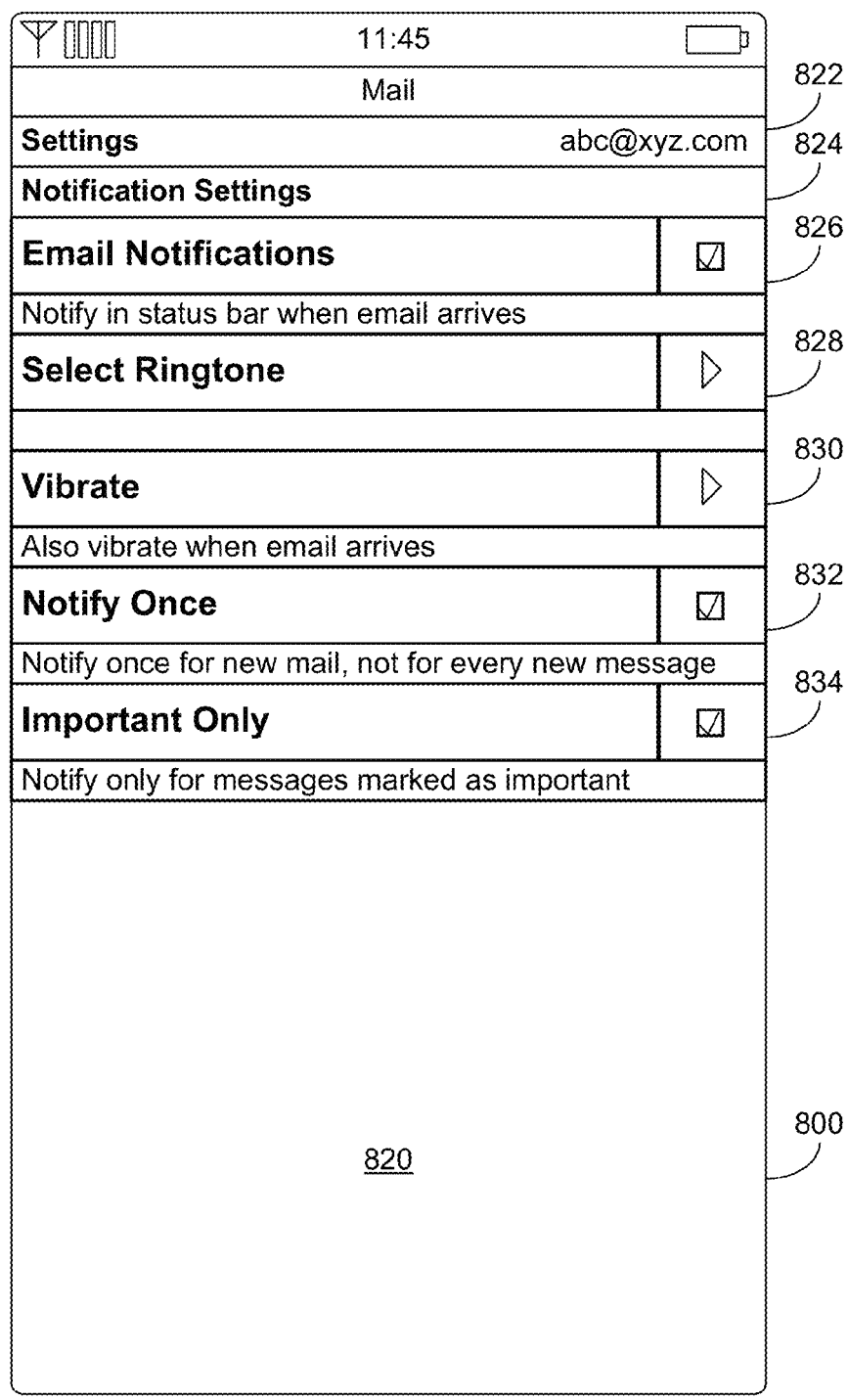
FIG. 8C is a schematic screenshot of a notifications settings configuration user interface of a messaging application on a mobile device, according to some embodiments.

FIG. 8C is a schematic screenshot of a notifications settings configuration user interface 820 of a messaging application on a mobile client device, according to some embodiments. In user interface 820, a user may configure settings related to new mail notifications.

User interface 820 includes a heading 822, with heading "Settings," indicating that user interface 820 is part of a "Settings" interface for configuring settings related to email messages. In some embodiments, where settings may be configured per account (i.e., distinct settings are stored for each of a plurality of user accounts (sometimes called email accounts or messaging accounts) accessed via a particular mobile client device), heading 822 also shows the account for which settings are shown in interface 820 and may be configured (e.g., "abc@xyz.com" in FIG. 8C). Sub-heading 824, with heading "Notification Settings," indicates that user interface 820 is an interface for configuring notification settings, which are a subset of settings related to email messages.

User interface 820 includes a setting 826 to enable or disable (e.g., toggle) notifications for any new email messages. If notifications are disabled, no notifications are shown for new email messages. If notifications are enabled, notifications are shown for at least some new email messages; whether new email notifications are shown for all new messages or some new messages (e.g., priority messages) is determined by additional configuration settings, described below.

User interface 820 includes a setting 828 to select a ringtone, audible alert, or other audible composition or sound for specific types of messages (e.g., messages flagged with a label or priority messages). Selection of setting 828 activates display of a ringtone selection interface, an example of which is described below with reference to FIG. 8D.

User interface 820 includes a setting 830 to configure vibrations (e.g., short or long vibration pulses, number of vibration pulses, etc.) for specific types of messages (e.g., messages flagged with a label or priority messages).

User interface 820 includes a "notify once" setting 832. In some embodiments, if the "notify once" setting 832 is enabled, whenever multiple new messages are received at once, only one (exactly one) notification is displayed for the group of multiple new messages, rather than displaying a separate notification for each individual new message. If the "notify once" setting 832 is disabled, whenever multiple new messages are received at once, a notification is displayed for each individual new message.

In some other embodiments, if the "notify once" setting 832 is enabled, a notification is not displayed when a group of new messages is received whenever there are new messages received earlier at the client device that have not yet been reviewed by the user. If the "notify once" setting 832 is disabled, a notification is displayed for each group of new messages received by the client device, regardless of whether there are earlier-received new messages at the client device that have yet to be reviewed, subject to other settings (e.g., the "important only" setting 832).

User interface 820 includes an "important only" setting 834. If the "important only" setting 834 is enabled, new mail notifications are displayed for new priority messages but not for non-priority messages. If the "important only" setting 834 is disabled, new mail notifications are displayed for both new priority messages and new non-priority messages.

In some embodiments, the notification settings data that are configured in user interface 820 are stored, at client computer 102, in notification settings 422. If the notification settings are configurable on a per-account basis, the settings are stored in notification settings 422 for the corresponding user account.

Figure 8D:
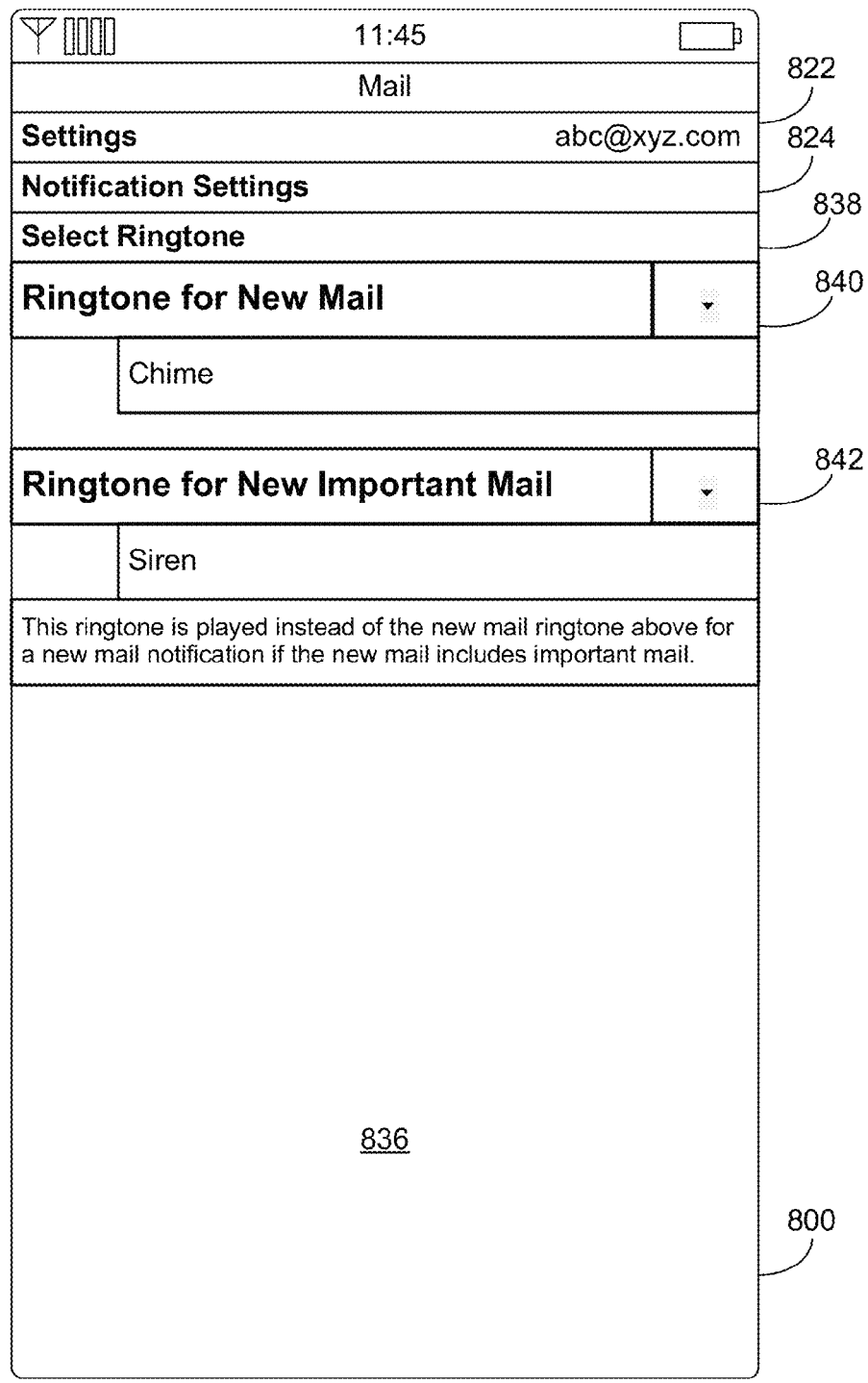
FIG. 8D is a schematic screenshot of a notification ringtone configuration user interface of a messaging application on a mobile device, according to some embodiments.

FIG. 8D is a schematic screenshot of a notification ringtone configuration user interface 836 of a messaging application on a mobile device, according to some embodiments. User interface 836 enables a user to specify particular ringtones or audible compositions to be played when a new mail notification is displayed. In some embodiments, user interface 836 is accessed by selecting the "select ringtone" option 828 in user interface 820 (shown in FIG. 8C).

User interface 836 includes heading 822, sub-heading 824, and sub-sub-heading 838. Sub-sub-heading 838 indicates to the user that user interface 836 is a user interface under the notification settings and is used for configuring ringtones for new mail notifications.

User interface 836 includes a ringtone setting 840 for new mail. The new mail ringtone setting 840 is the setting for the default ringtone, alert sound, or other composition, sound recording, or audio clip that is played for new mail notifications. The ringtone (e.g., an audio file 430) that is specified in new mail ringtone setting 840 is played for new mail notifications unless a different ringtone is specified for specific types of new mail notifications. Furthermore, if the "important only" setting 834 (FIG. 8C) is enabled, then the ringtone specified in setting 840 will not be played when the new mail received contains no important/priority messages. In some embodiments, the user selects a ringtone for ringtone setting 840 by interacting with a pull-down menu affordance corresponding to setting 840.

User interface 836 includes a ringtone setting 842 for new important/priority messages. The ringtone setting 842 for new important/priority messages may be enabled, with a ringtone different than the one specified in the new mail ringtone setting 840, or disabled. If the ringtone setting 842 is disabled, then the ringtone specified in ringtone setting 840 is played for new mail notifications for priority messages. If the ringtone setting 842 is enabled and a ringtone is specified, then the ringtone specified in setting 842 is played instead of the ringtone specified in setting 840 for new mail notifications for priority messages. In some embodiments, the user selects a ringtone for setting 842 by interacting with a pull-down menu affordance corresponding to setting 842.

Figure 8E:
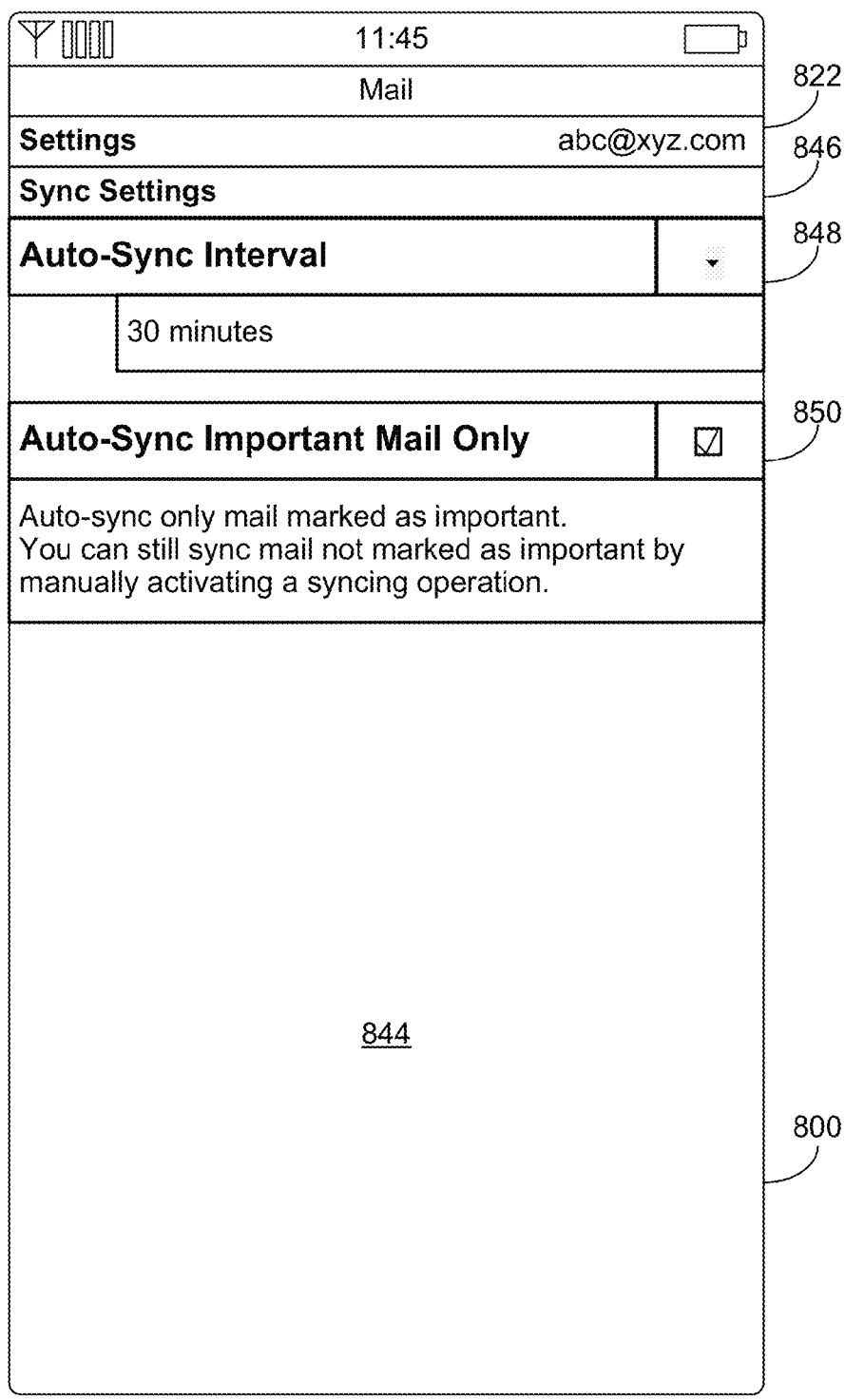
FIG. 8E is a schematic screenshot of a sync settings configuration user interface of a messaging application on a mobile device, according to some embodiments.

FIG. 8E is a schematic screenshot of a sync settings configuration user interface 844 of a messaging application on a mobile device, according to some embodiments. In user interface 844, a user may specify settings related to synchronization of messages with server system 106 (e.g., fetching of messages from server system 106). User interface 844 includes heading 822 and sub-heading 846. Sub-heading 846 indicates that user interface 844 is a user interface for viewing and modifying sync settings.

User interface 844 includes an auto-sync interval setting 848. The auto-sync interval setting 848 allows the user to select from a selection of predefined time intervals (e.g., 5 minutes, 10 minutes, 30 minutes, 1 hour), and optionally allows the user to select a "manual" setting, in which case synchronization with the server occurs only when the user initiates synchronization (e.g., by performing a predefined affirmative user action). In some embodiments, the user selects an interval for setting 848 by interacting with a pull-down menu affordance corresponding to setting 848. If a time interval is set for setting 848, mobile client device 102-*c* and server system 106 periodically synchronize (sync) messages at the set interval, without affirmative user activation. In some embodiments, message synchronizing includes mobile client device 102-*c* downloading from server system 106 new messages and message modifications (e.g., message deletions, labeling or flagging of messages, moving of messages into folders, composed and sent messages, etc.) performed at other client devices 102, and uploading to server system 106 new messages composed at mobile client device 102-*c* and message modifications performed at mobile client device 102-*c*.

If the auto-sync interval setting 848 is set to manual only, the mobile client device 102-*c* does not automatically sync messages with server system 106; the syncing operation is initiated by the user (e.g., by selecting a message refresh/update affordance in the messaging application, or by speaking a respective command to the mobile client device 102-*c*).

User interface 844 also includes an "auto-sync important mail only" setting 850. If setting 850 is disabled, then when an automatic syncing operation is performed, all messages are synchronized. If setting 850 is enabled, then only priority messages are synchronized when an automatic syncing operation is performed; non-priority messages may be synchronized in a user-initiated manual sync operation.

In some embodiments, the client device initiates an automatic message synchronization or fetching operation in response to a push notification from the server system that there are new messages. Depending on the embodiment, the push notification may include or not include information indicating whether or not the new messages include priority messages. In embodiments in which the push notifications include information indicating whether the new messages include priority messages, the client device may ignore push notifications (and not initiate automatic synchronization or fetching operations in response) that do not indicate that the new messages include priority messages, in accordance with an email configuration setting (e.g., an "auto-sync important mail only" setting 850). In embodiment in which the push notifications do not include information indicating whether or not the new messages include priority messages, the client device synchronizes or fetches only priority messages when automatically synchronizing or fetching in response to the push notification, in accordance with an email configuration setting (e.g., an "auto-sync important mail only" setting 850).

Figure 8F:
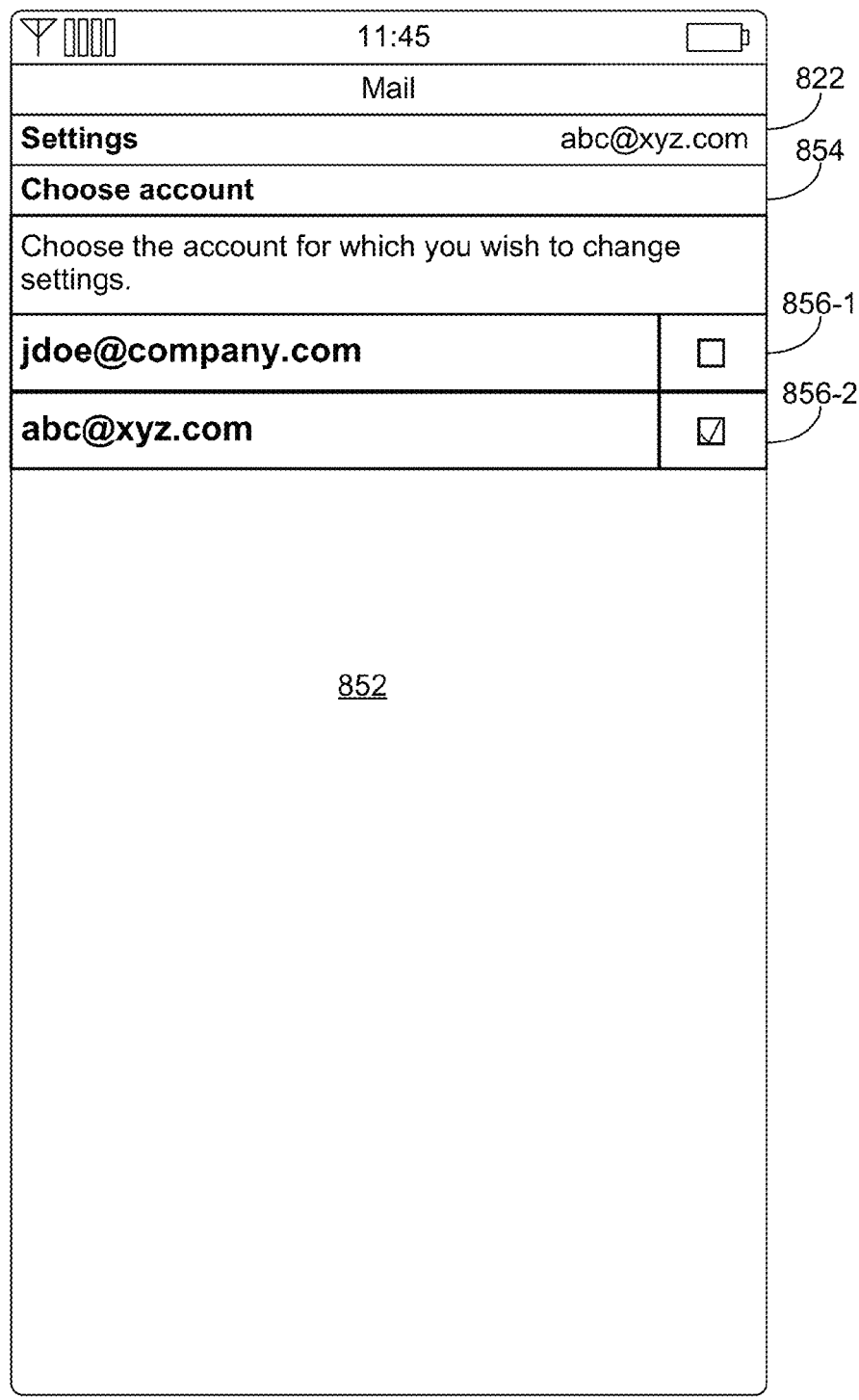
FIG. 8F is a schematic screenshot of an account selection user interface of a messaging application on a mobile device, according to some embodiments.

FIG. 8F is a schematic screenshot of an account selection user interface 852 of a messaging application on a mobile device, according to some embodiments. In some embodiments, the notification and synchronization settings are configured on a per-account basis. User interface 852 allows a user to select the account for which they wish to view or modify notification and/or synchronization settings.

User interface 852 includes heading 822 and sub-heading 854. Sub-heading 854 indicates that user interface 852 is a user interface for selecting a user account (e.g., an email account or message/conversation account).

User interface 852 lists the accounts 856 in the messaging application. The user selects the desired account 856 and may then return to user interface 820, 836, or 844 to view notification, ringtone, or sync settings for the selected account. Thus, notification, ringtone, and sync settings may be different between accounts. In one example, for a first user account, notifications are set by the user to be displayed only for new priority messages, and for a second user account, notifications are set by the user to be displayed for all new messages. Similarly, the ringtone setting for important messages may be different between the multiple accounts (e.g., a first ringtone is set by the user for important messages received in a first user account, and a second ringtone, distinct from the first ringtone, is set by the user for important messages received in a second user account). In a further example, for a first user account the auto-sync setting is set by the user to synchronize all messages, and for a second user account the auto-sync setting is set by the user to synchronize only priority messages.

Figure 8G:
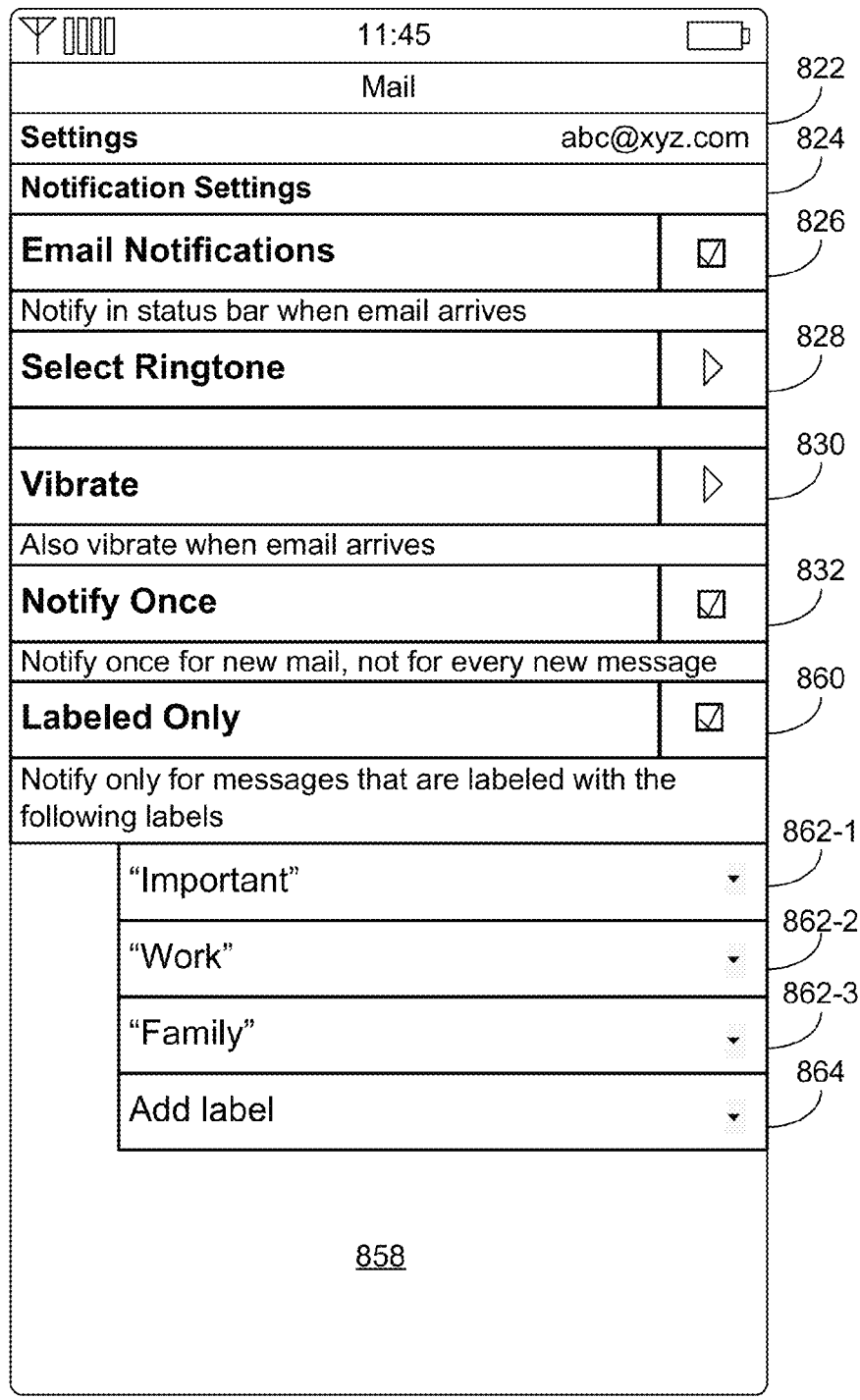
FIG. 8G is another schematic screenshot of a notifications settings configuration user interface of a messaging application on a mobile device, according to some embodiments.

FIG. 8G is another schematic screenshot of a notifications settings configuration user interface of a messaging application on a mobile device, according to some embodiments. FIG. 8G shows user interface 858, which is an alternative embodiment to user interface 820 shown in FIG. 8C. User interface 858 includes heading 822, sub-heading 824, and settings 826, 828, 830, and 832.

User interface 858 also includes a "labels only" setting 860. The "labels only" setting 860 is similar to "important only" setting 834, in that when "labels only" setting 860 is enabled, new mail notifications are displayed for new messages only when the new messages include messages that are flagged with specified labels 862. In some implementations the specified labels (which determine the received messages flagged for notification) include user-defined labels (e.g., labels "work" 862-2 and "family" 862-3) and predefined labels (e.g., "important" label 862-1 for priority messages). The predefined labels are sometimes called system labels, as they are not user-defined. Typically, predefined labels are assigned to messages in accordance with predefined criteria that are not user-specific. The user may add additional labels to the list for setting 834 by selecting the label adding affordance 864. A label may be removed from the list as well. In another example, the specified labels are the system label "Important" and the label "Starred" which is applied to messages selected by the user.

Figure 8H:
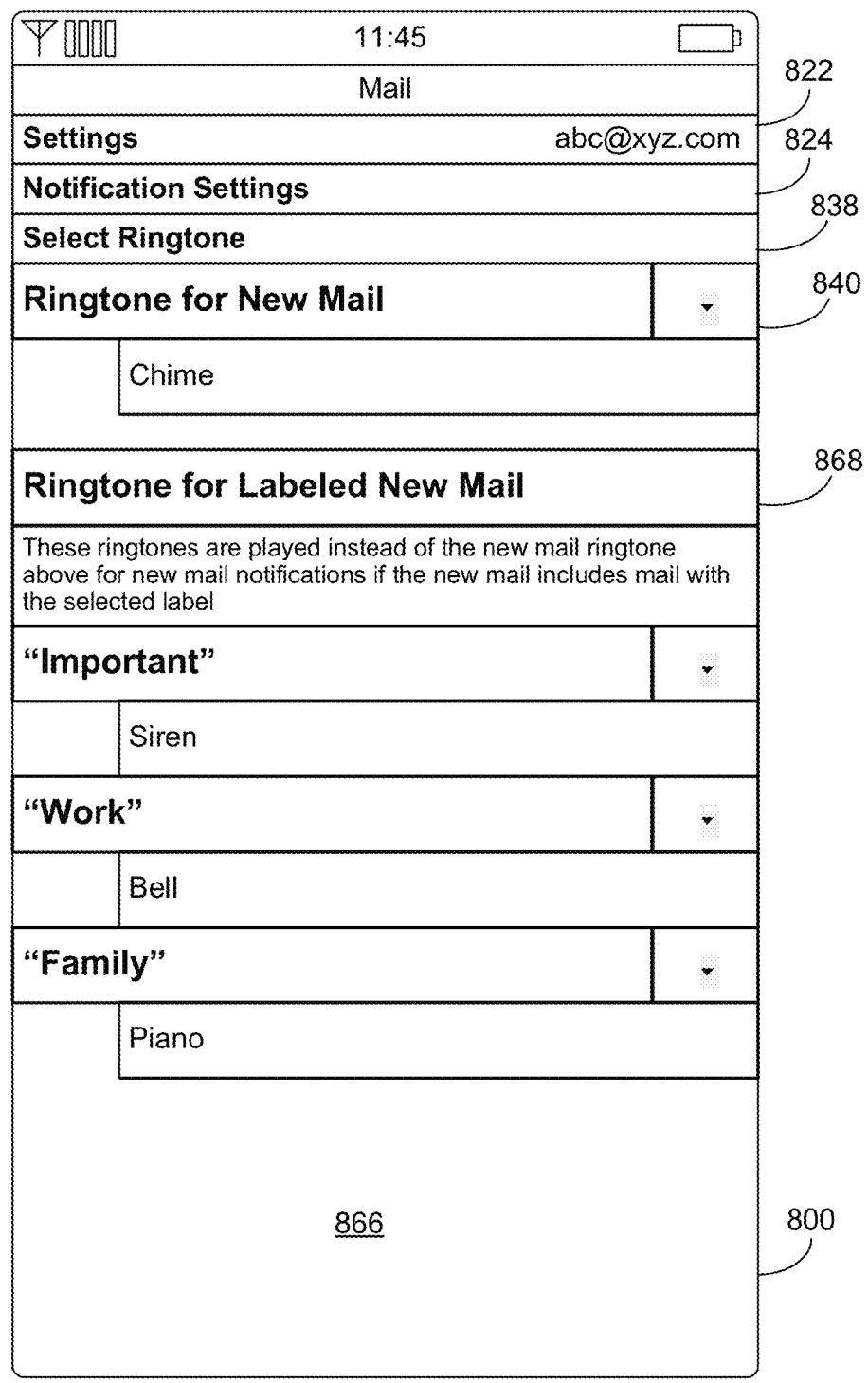
FIG. 8H is another schematic screenshot of a notification ringtone configuration user interface of a messaging application on a mobile device, according to some embodiments.
Figure 9A:
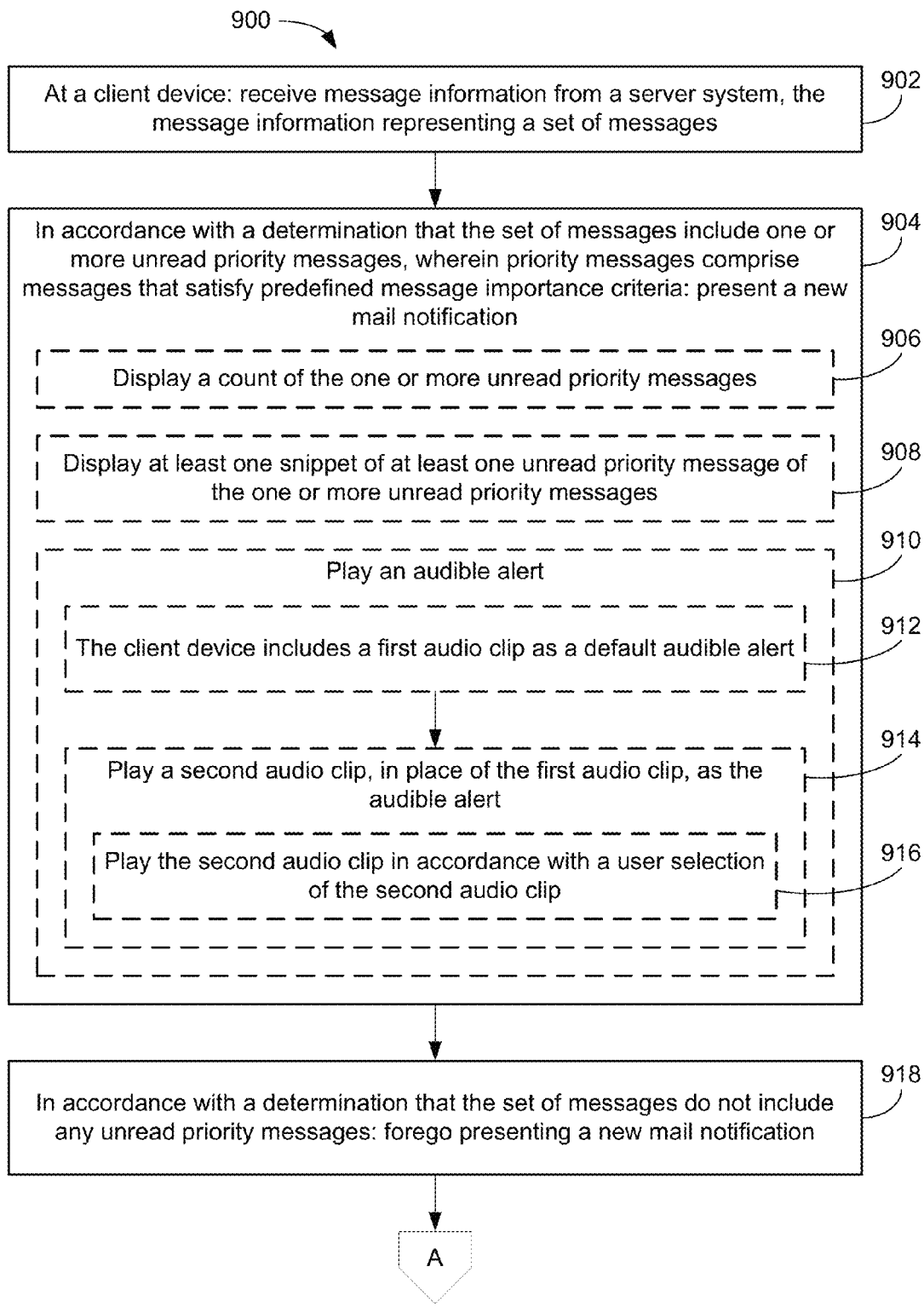
FIGS. 9A-9D present a flow diagram of a process for presenting notifications, according to some embodiments.
Figure 9B:
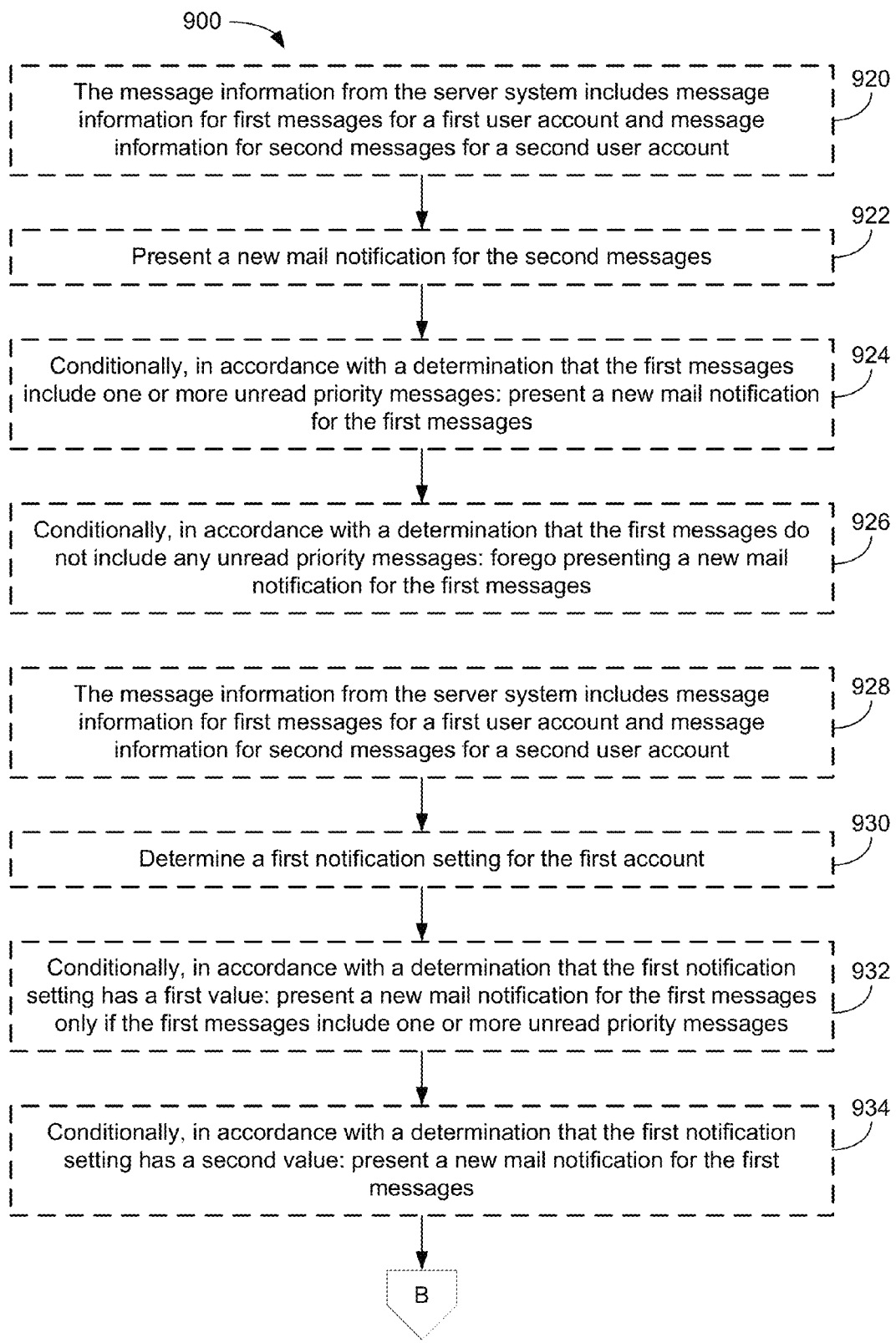
Figure 9C:
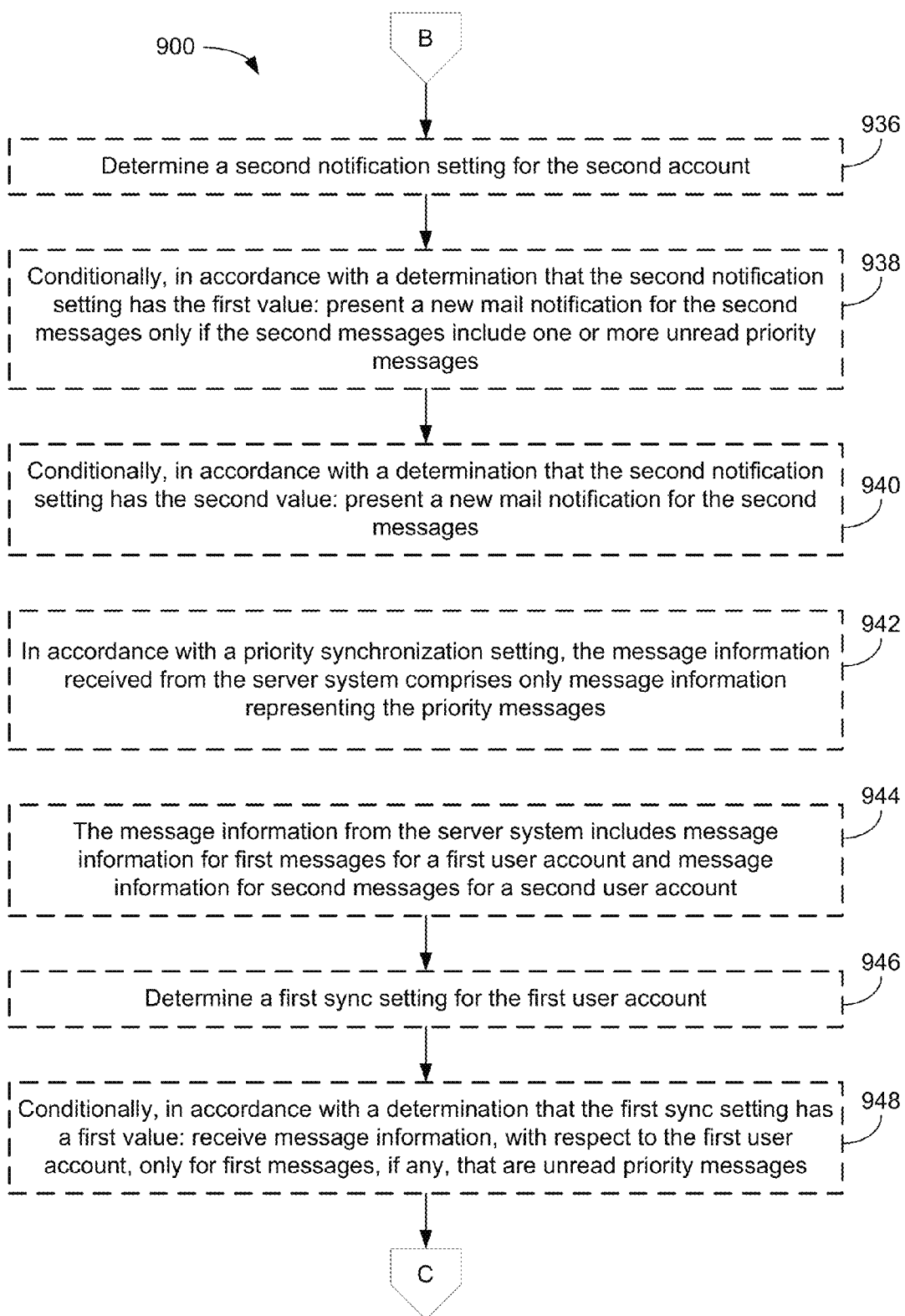
Figure 9D:
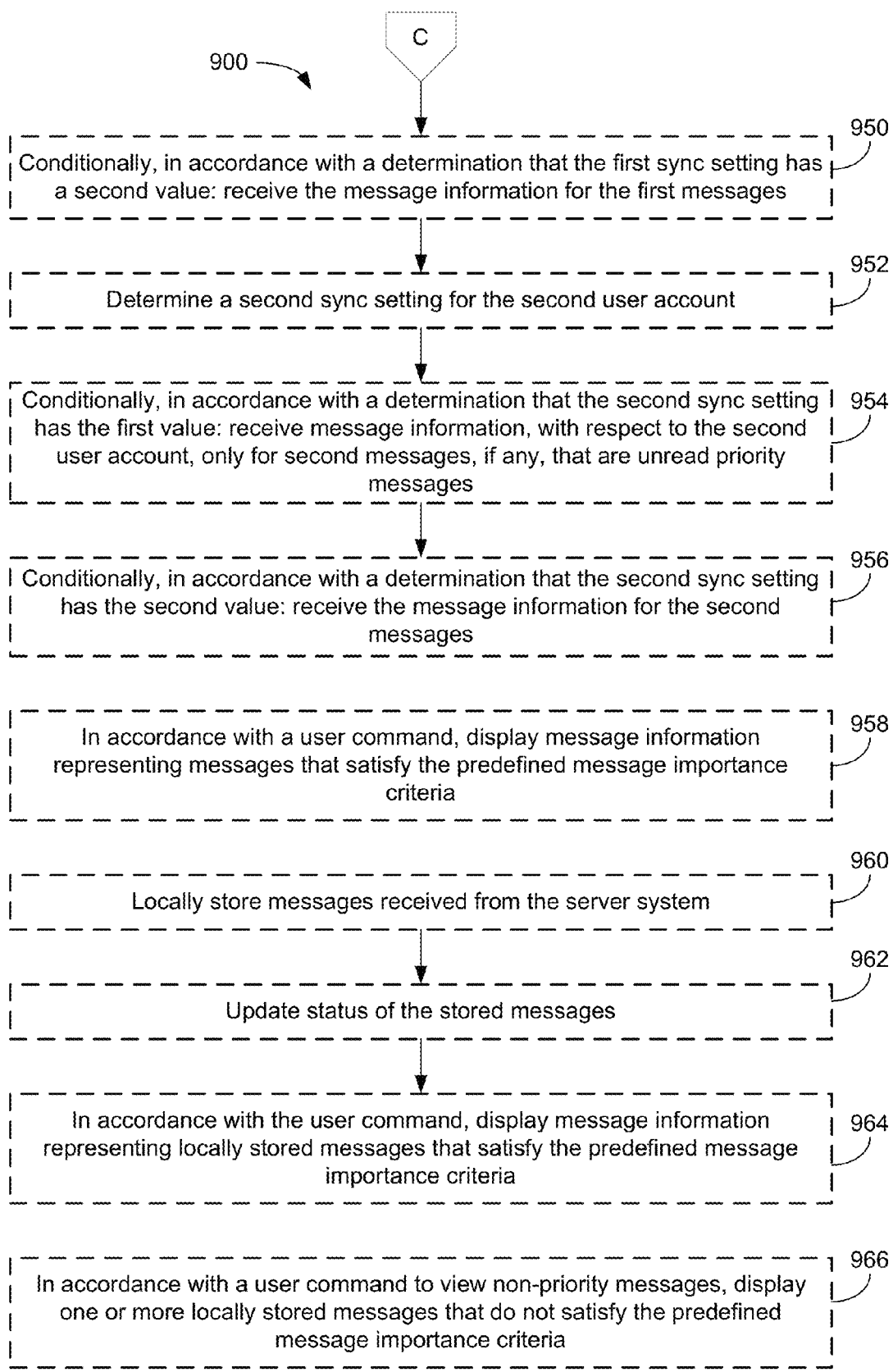

FIG. 8H is another schematic screenshot of a notification ringtone configuration user interface of a messaging application on a mobile device, according to some embodiments. FIG. 8H shows user interface 866, which is an alternative embodiment to user interface 836 shown in FIG. 8D. User interface 866 includes heading 822, sub-heading 824, sub-sub-heading 838, and setting 840.

User interface 866 also includes a setting 868 for specifying a ringtone for labeled new mail. When a ringtone is specified for a particular label, then the specified ringtone is played, instead of the ringtone specified by ringtone setting 840 for new mail, when a new mail notification is displayed for a new message having that particular label. Ringtones may be specified for user-defined labels (e.g., the labels "work" and "family") and for predefined labels (e.g., the label "important" for priority messages).

It should be appreciated that the placement of particular settings in particular user interfaces, as described above with reference to FIGS. 8C-8H (e.g., the "important only" setting 834 in user interface 820 as opposed to, say, a general settings user interface for the corresponding email account) are merely exemplary. For example, the "important only" setting 834 for an email account may be placed in, and accessed from, a general settings user interface for the email account instead of the notifications settings user interface 820 for the email account.

FIGS. 9A-9D contain a flow diagram of a process 900 for presenting notifications, according to some embodiments. Process 900 may be performed at a client device (e.g., client mobile device 102-c). It should be appreciated that while process 900 is described with respect to messages, process 900 is analogously applicable to conversations having multiple messages as well.

The client device receives message information from a server system (902). The message information represents a set of messages. The client device may communicate (e.g., in a synchronization operation) with a server system (e.g., server system 106) to receive message information representing the set of messages, which includes one or more messages. Typically, the received message information is downloaded by the client device during an automatic synchronization operation or during a synchronization operation that has been manually initiated by a user of the client device.

In some embodiments, the received message information includes, for each message in the set of messages, date and time information, sender information, recipient information, a subject, and, if any, one or more labels with which the messages are flagged. For example, if a message is flagged with the "important" label as a result of meeting the predefined message importance criteria, the "important" label is received by the client device from the server system. Optionally, in some embodiments the message information received by the client device (e.g., during the synchronization operation) for a respective new message also includes one or more portions of the message body of the respective new message. As noted above, the message body and the message header (which typically contains information that identifies the message sender, recipients, one or more timestamps, and the message subject) are distinct portions of a message. In some other embodiments the message information received during an inbox synchronization operation includes message subject information, and optionally snippet information, for each conversation for which new message information is received, but the transmission of message body information is deferred until the user sends a command requesting to view a particular conversation or alternatively a particular message. In these embodiments, message body portions, or alternatively full message body information, is received during a conversation synchronization operation or message synchronization operation, in response to a user command to view a respective conversation or message.

In accordance with a determination that the set of messages (represented by the received message information) include one or more unread priority messages, where priority messages include messages that satisfy predefined message importance criteria, the client device presents a new mail notification (904). When the set of messages include one or more unread priority messages (e.g., messages that satisfy predefined message criteria, as described above with reference to FIGS. 5A-5C), the client device presents a new mail notification. For example, a new mail notification 804 (FIG. 8A) is displayed when unread priority messages are received by the client device.

In some embodiments, priority messages are identified by the client device by a label (e.g., a predefined "important" label) with which the priority messages are flagged. The new mail notification alerts the user that the client device has received new (e.g., unread) messages that satisfy the predefined message importance criteria, and thus may be worthy of the user's attention. In some embodiments (e.g., in client devices in which a new mail notification setting has been enabled, as described above with respect to FIG. 8C), the new mail notification includes a visual notification (e.g., displaying of graphics and/or text on the display of the client device, controlled blinking or flashing of a display region or lighting element) and/or an audible alert (e.g., an audio composition such as a ringtone, sound, or alert).

In some embodiments, presenting the new mail notification includes displaying a count of the one or more unread priority messages (906). For example, the new mail notification 804 shown in FIG. 8A is a visual notification that includes a count 806 of the unread priority messages in the user's email account. In another example, the visual notification includes a number indicating how many messages in the set of messages (i.e., messages represented by the received mail information) are unread priority messages.

In some embodiments, presenting the new mail notification includes displaying at least one snippet of at least one unread priority message of the one or more unread priority messages (908). Optionally, each snippet in the visual notification includes one or more portions of the text in the message body of an unread priority message in the set of messages. For example, the new mail notification 804 in FIG. 8A includes a snippet 808 of one of the unread priority messages.

In some embodiments, (e.g., in client devices in which a new mail ringtone notification setting has been enabled, as described above with respect to FIGS. 8C and 8D) presenting the new mail notification includes playing an audible alert (908). The audible alert may be an audio clip, which can be a ringtone, sound recording, or other audio composition.

In some embodiments, the client device includes a first audio clip as a default audible alert, and playing the audible alert includes playing a second audio clip, in place of the first audio clip, as the audible alert (914). In these embodiments, the client device has a first audio clip (e.g., a ringtone, audio composition, sound recording, etc.) set as a default clip for the audible alert for new mail notifications generally. A second, different audio clip is played in place of the first audio clip as the audible alert for new mail notifications that notify the user of unread priority messages (914). More specifically, the second audio clip is played for new mail notifications when the set of new messages include at least one priority message, as discussed above with reference to FIG. 8D.

In some embodiments, the client device plays the second audio clip in accordance with a user selection of the second audio clip (916). Optionally, the second clip is set as the clip for new mail notifications for priority messages in accordance of a user selection of the clip. For example, the user interface 836 shown in FIG. 8D enables the user of a respective mobile client device 102-c (FIG. 1A) to select an audio clip as the ringtone for important messages (i.e., the audio clip for new mail notifications for priority messages).

In accordance with a determination that the set of messages (i.e., the set of messages represented by the mail information received in operation 902) do not include any unread priority messages, the client device foregoes presenting a new mail notification (918). If the received set of messages does not include unread priority messages, the client device skips presenting a new mail notification.

Thus, a client device presents a new mail notification when there are new or unread priority messages, but does not present a new mail notification when there are no new or unread priority messages. Optionally, this selective presentation of new mail notifications is performed in accordance with a user-configurable setting to present notifications only for important messages (e.g., setting 834, FIG. 8C). By selectively presenting new mail notifications, the client device does not interrupt the user with notifications for messages that have not been labeled as important (e.g., labeled as important by a server system, in accordance with one or more importance prediction models, or in accordance with other predefined priority criteria).

As described above with respect to FIG. 8F, in some embodiments selective presentation of new mail notifications is configured on a per-account basis. These embodiments are applicable to a respective client device is associated with multiple email addresses (e.g., multiple user accounts on server system 106) and receives message information for messages addressed to the multiple email addresses. In one example, the client device includes email configuration settings for a first user account, including a notification setting to provide new mail notifications only for important messages (new/unread priority messages), and email configuration settings for a second user account, including a notification setting to provide new mail notifications for all new messages. In this example, when first and second user accounts associated with the client device both have new messages, the message information received from the server system includes message information for first messages for a first user account and message information for second messages for a second user account (920). The client device presents a new mail notification for the second messages (922); conditionally, in accordance with a determination that the first messages include one or more unread priority messages, presents a new mail notification for the first messages (924); and conditionally, in accordance with a determination that the first messages do not include any unread priority messages, foregoes presenting a new mail notification for the first messages (926).

More generally, the message information received from the server system may include message information for messages addressed to multiple email addresses, each email address corresponding to a different user account. A new mail notification is presented by the client device when the set of messages represented by the received message information includes at least one new message for a user account having a notification setting to provide new mail notifications for new messages without regard to message importance (922). Furthermore, a new mail notification is presented by the client device when the set of messages represented by the received message information includes at least one unread priority message (e.g., a message labeled as "important") for a user account having a notification setting to provide new mail notifications only for unread priority messages (924). Thus, the selective presentation of new mail notifications may be configured on a per-account basis; new mail notifications may be selectively presented for one email address, and new mail notifications may be presented for another email address regardless of whether the new messages include priority messages.

In some embodiments, the message information from the server system includes message information for first messages for a first user account and message information for second messages for a second user account (928). The client device determines a first notification setting for the first account (930). Conditionally, in accordance with a determination that the first notification setting has a first value, the client device presents a new mail notification for the first messages only if the first messages include one or more unread priority messages (932); and conditionally, in accordance with a determination that the first notification setting has a second value, the client device presents a new mail notification for the first messages (934). The client device determines a second notification setting for the second account (936). Conditionally, in accordance with a determination that the second notification setting has the first value, the client device presents a new mail notification for the second messages only if the second messages include one or more unread priority messages (938); and conditionally, in accordance with a determination that the second notification setting has the second value, the client device presents a new mail notification for the second messages. As described above, a client device may receive messages addressed to different email addresses (user accounts), and whether a new mail notification is presented only for new priority messages may be a setting that is configurable per account. Each of a first account and a second account on the client device has notification settings, including a setting whether to display new mail notifications only for new priority messages (e.g., setting 834, FIG. 8C). For a respective account, if that setting has a first value (e.g., setting 834 is enabled), new mail notifications for the respective account are presented only for new priority messages. If that setting has a second value (e.g., setting 834 is disabled), new mail notifications for the respective account are presented for new messages regardless of whether the new messages include priority messages.

In some embodiments, in accordance with a priority synchronization setting, the message information received from the server system comprises only message information representing priority messages (942). In these embodiments, the client device includes a priority synchronization setting (e.g., setting 850, FIG. 8E) regarding synchronization of priority and non-priority messages with the server system. When the priority synchronization setting has a first value, the client device synchronizes only priority messages with the server system, and when the priority synchronization setting has a second value the client device synchronize messages regardless of priority or importance. Stated another way, when the priority synchronization setting is set to synchronize only priority messages, the message information received from the server system comprises only message information representing priority messages (i.e., message information representing non-priority messages are not included in the message information received from the server system). For example, if setting 850 is enabled, when client device 102-*c* auto-syncs with the server system 106, the client device 102-*c* receives message information for priority messages from the server system 106 but not message information for non-priority messages. If setting 850 is disabled, the client device 102-*c* receives message information for priority messages and message information for non-priority messages from the server system 106 when auto-syncing.

Selective synchronization of messages reduces power consumption by the client device, and reduces transmission bandwidth usage (i.e., reduces communications between the client device and the server system). When the client device is configured for selective synchronization (for all user accounts, or for a respective user account), non-priority messages in the respective user account(s) remain at the server system from where they may be downloaded at a later time or by a different client device.

In some embodiments, the message information from the server system includes message information for first messages for a first user account and message information for second messages for a second user account (944). The client device determines a first sync setting for the first account (946). Conditionally, in accordance with a determination that the first sync setting has a first value, the client device receives message information, with respect to the first user account, only for first messages, if any, that are unread priority messages (948); and conditionally, in accordance with a determination that the first sync setting has a second value, the client device receives the message information for the first messages (950), without regard to whether the first messages are priority messages. The client device determines a second sync setting for the second account (952). Conditionally, in accordance with a determination that the second sync setting has the first value, the client device receives message information, with respect to the second user account, only for second messages, if any, that are unread priority messages (954); and conditionally, in accordance with a determination that the second sync setting has the second value, the client device receives the message information for the second messages (956), without regard to whether the second messages are priority messages.

Like the notification settings described above with reference to operations 928-940, the synchronization setting may be configured per account. For example, for a first account, the respective synchronization settings may be set such that messages are synchronized regardless of importance; and for a second account, the respective synchronization settings may be set such that priority messages are synchronized but non-priority messages are not synchronized (during automatic synchronization operations, also herein called auto-syncs or auto-sync operations). An example of a synchronization setting is setting 850 in FIG. 8E. Setting 850 may be configured per account, in which case each user account has a distinct synchronization setting 850. For a respective account, if synchronization setting 850 is enabled, when client device auto-syncs messages for the respective account, priority messages are synchronized but non-priority messages are not synchronized. If synchronization setting 850 is disabled for the respective account, when client device auto-syncs messages for the respective account, messages are synchronized for the respective account without regard for importance.

In some embodiments, in accordance with a predefined user command, the client device displays message information representing only messages that satisfy the predefined message importance criteria (958). The client device may display priority messages on screen and not display non-priority messages, in accordance with a user command. For example, when the messaging application on the client device is activated by the user, the default view of the messaging application may be a predefined priority inbox user interface (e.g., interface 810, FIG. 8B) in which priority messages are displayed but non-priority messages are not displayed. As another example, the messaging application may switch from an interface where both priority and non-priority messages are displayed to the priority inbox user interface in accordance with a predefined user command (e.g., by the user selecting an affordance to switch views to the priority inbox user interface, in which case the predefined user command is a command to display the priority inbox user interface).

In some embodiments, the client device locally stores messages received from the server system (960), updates status of the stored messages (962), and in accordance with the user command, displays message information representing locally stored messages that satisfy the predefined message importance criteria (964). When the client device receives messages from the server system (e.g., in a synchronization operation), the received messages are stored at the client device (e.g., in a message database 420, FIG. 4). When the same messages are manipulated (e.g., a message is replied to or forwarded, an "important" label or any other label is applied to a message, etc.) at another client device in communication with the server system, the status changes of the messages, resulting from the manipulations, are synchronized to the server system from the other client device, and from the server system to the client device where the messages are stored. The stored messages are updated with the status changes. When the client device displays a priority inbox user interface that displays priority messages but not non-priority messages, locally stored priority messages, if any, are displayed in the priority inbox user interface. As described above with respect to step 958, the priority inbox user interface is displayed in response to a predefined user command (e.g., the user selecting an affordance to switch to the priority inbox user interface, or the user activating the messaging application with the priority inbox user interface set as the default view).

In some embodiments, in accordance with a user command to view non-priority messages, the client device displays one or more locally stored messages that do not satisfy the predefined message importance criteria (966). The client device displays a predefined user interface that displays non-priority messages, with or without displaying priority messages also (e.g., an interface analogous to the user interface shown in FIG. 6B, where messages displayed under the "Everything Else" heading 644 include non-priority messages). An example of a user command that causes the client device to display the interface with non-priority messages is the user command generated when a user selects an affordance to switch from the priority inbox user interface to the user interface that includes non-priority messages.

Figure 10:
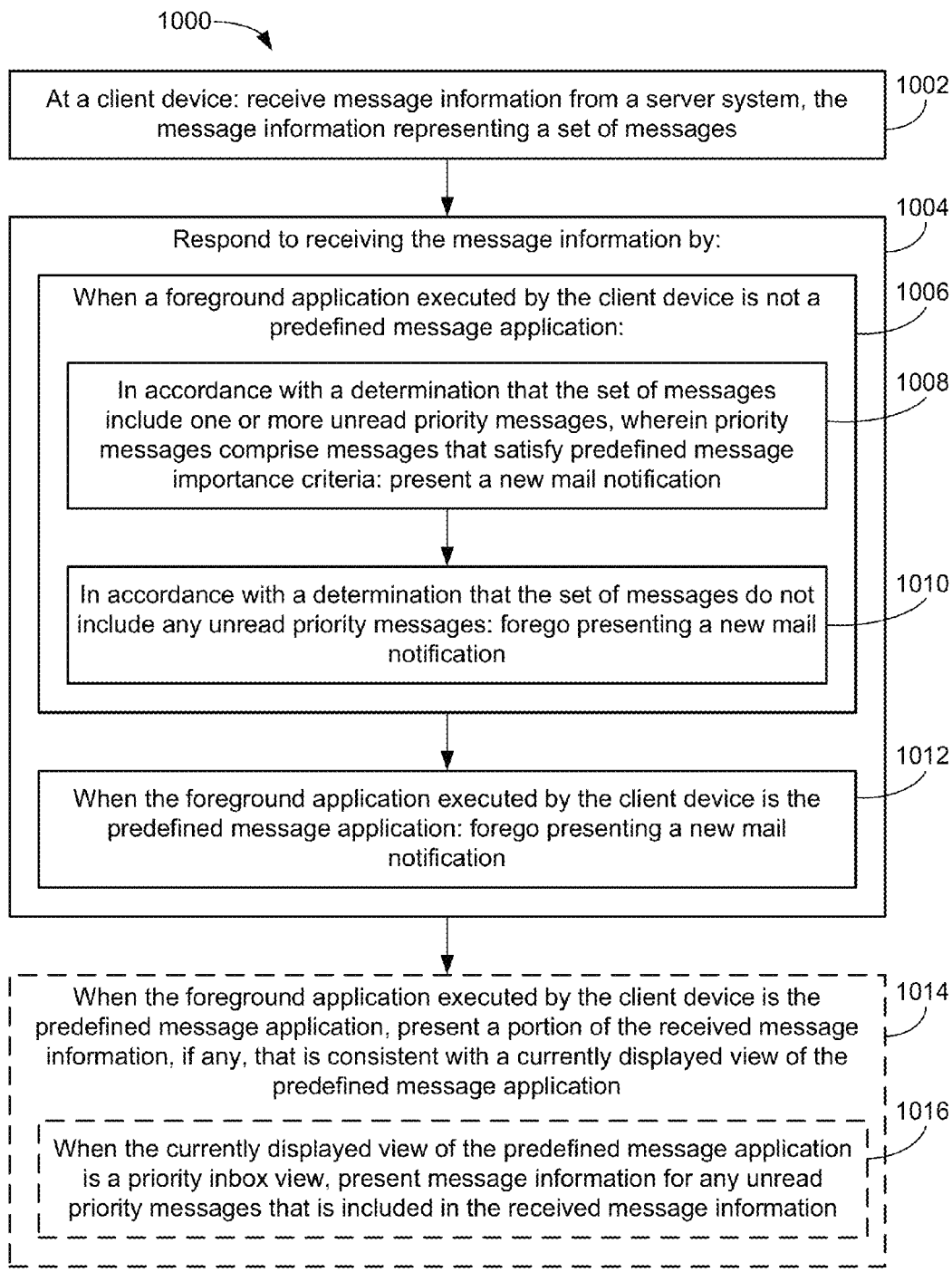
FIG. 10 is a flow diagram of another process for presenting notifications, according to some embodiments.

FIG. 10 is a flow diagram of another process 1000 for presenting a new mail notification, according to some embodiments. Process 1000 may be performed at a client device (e.g., client mobile device 102-*c*). It should be appreciated that while process 1000 is described with respect to messages, process 1000 is analogously applicable to conversations as well.

A client device receives message information from a server system, the message information representing a set of messages (1002). The client device receives message information (e.g., in a synchronization operation) from the server system (e.g., server system 106). The message information includes message information representing one or more messages.

The client device responds to the receipt of the message information (1004) by: when a foreground application executed by the client device is not a predefined message application (1006), in accordance with a determination that the set of messages include one or more unread priority messages, wherein priority messages comprise messages that satisfy predefined message importance criteria, the client device presents a new mail notification (1008). In accordance with a determination that the set of messages do not include any unread priority messages, the client device foregoes presenting a new mail notification (1010). When the client device receives the message information, it displays a new mail notification, or not, depending on whether the application running in the foreground is a predefined messaging application (e.g., interface 810 of a messaging application, FIG. 8B) and whether the messages include unread priority messages. If the messaging application is not in the foreground (e.g., the messaging application is running in the background, or the messaging application is not activated) and the messages include one or more unread priority messages, then a new mail notification (e.g., notification 804, shown in FIG. 8A) is displayed. If the messaging application is not in the foreground (e.g., the messaging application is running in the background, or the messaging application is not activated) and the messages do not include one or more unread priority messages, then a new mail notification is not displayed.

When the foreground application executed by the client device is the predefined message application, the client device foregoes presenting a new mail notification (1012). If the messaging application is in the foreground, then a new mail notification is not displayed regardless of whether the messages include unread priority or non-priority messages. In some embodiments, the client device, instead of displaying a new mail notification, refreshes the interface of the messaging application that is already being displayed to display the unread messages.

In some embodiments, when the foreground application executed by the client device is the predefined message application, the client device presents a portion of the received message information, if any, that is consistent with a currently displayed view of the predefined message application (1014). In some embodiments, when the currently displayed view of the predefined message application is a priority inbox view, the client device presents message information (e.g., a list of messages, or a list of conversations) for any unread priority messages included in the received message information (1016). In one example, the priority inbox view (e.g., user interface 810, FIG. 8B) displays a list of priority messages (or a list of conversations that include priority messages) and excludes non-priority messages.

In some embodiments, the messaging application includes additional views or user interfaces for displaying messages. For example, the message application typically includes an inbox view (e.g., a user interface analogous to that shown in FIG. 6B) that displays a list of messages that includes both priority messages and non-priority messages. In another example, the messaging application includes an unread messages view for displaying a list of new or unread messages (or a list of conversations that include at least one new or unread message), regardless or priority; this view excludes read messages (typically defined as messages marked as read), or excludes conversations in which all messages have been read (i.e., marked as read). In yet another example, the messaging application includes a priority message list view, distinct from the aforementioned priority inbox view. In the priority message list view (e.g., as in FIG. 8B), message information for priority messages, including both unread and read priority messages, but not the non-priority messages, is displayed. In some implementations the message information displayed in the priority message list view is a list of priority messages; in some other implementations the message information displayed in the priority message list view is a list of conversations that include at least one priority message.

As described above, notifications may be selectively displayed, based on whether the new messages include priority messages. The selective displaying of notifications lessens the possibility that the user is interrupted for messages that are not important to the user. Synchronization of messages may also be selective, so that transmission bandwidth is not used to download messages that do not meet predefined message importance criteria. More generally, the selective displaying of notifications and selective synchronizing is applicable to messages that are flagged with labels. For example, notifications may be displayed just for new messages with specified labels. In some embodiments, the selective displaying of notifications and selective synchronizing for priority messages is an instance of selective displaying of notifications and selective synchronizing for labeled messages; in some embodiments, priority messages are messages that have been labeled with a predefined label (e.g., an "important" label).

The foregoing description, for purpose of explanation, has been described with reference to specific embodiments. However, the illustrative discussions above are not intended to be exhaustive or to limit the embodiments disclosed. Many modifications and variations are possible in view of the above teachings. The embodiments were chosen and described in order to best explain the principles of the disclosed embodiments and their practical applications, to thereby enable others skilled in the art to best utilize various disclosed embodiments with various modifications as are suited to the particular use contemplated.

What is claimed is:

1. A method for presenting notifications, comprising:
at a computer system:
obtaining message information, the message information representing a set of messages, and an importance score associated with each respective message in the set of messages, wherein the importance score is generated based at least in part on a global importance prediction model and a user importance prediction model;
in accordance with a determination that the set of messages includes one or more unread priority messages, wherein priority messages comprise messages with which the associated importance score satisfy one or more predefined message importance criteria:
presenting a new mail notification, wherein
the global importance prediction model includes a social graph-related weight,
the user importance prediction model is based on information associated with a single user, and
the global importance prediction model is based on information associated with a plurality of users.

2. The method of claim 1, further comprising:
in accordance with a determination that the set of messages do not include any unread priority messages:
foregoing presenting a new mail notification.

3. The method of claim 1, wherein presenting the new mail notification includes one of:
displaying a count of the one or more unread priority messages, or
displaying a sender of an unread priority message of the one or more priority messages.

4. The method of claim 1, wherein the importance score associated with a respective message is generated by:
determining a first weight for the respective message using the global importance prediction model;
determining a second weight for the respective message using the user importance prediction model; and
combining the first weight and the second weight.

5. The method of claim 1, wherein the global importance prediction model includes a plurality of social graph-related weights.

6. The method of claim 1, further comprising:
displaying the one or more unread priority messages in a portion of a display that is separate from a portion of the display used to display messages that fail to satisfy the one or more predefined message importance criteria.

7. The method of claim 1, further comprising:
collecting, from a user, feedback data regarding importance of a message of the set of messages; and
updating the user importance prediction model in accordance with the feedback data.

8. The method of claim 1, wherein the importance score associated with a respective message is generated based also at least in part on a group importance prediction model.

9. The method of claim 8, wherein the the group importance prediction model is based on information associated with a group of users.

10. A computer system, comprising:
one or more processors;
memory storing one or more programs for execution by the one or more processors, the one or more programs comprising instructions for:
receiving message information from a server system, the message information representing a set of messages, and an importance score associated with each respective message in the set of messages, wherein the importance score is generated based at least in part on a global importance prediction model and a user importance prediction model;
in accordance with a determination that the set of messages includes one or more unread priority messages, wherein priority messages comprise messages with which the associated importance score satisfy one or more predefined message importance criteria:
presenting a new mail notification, wherein
the global importance prediction model includes a social graph-related weight,
the user importance prediction model is based on information associated with a single user, and
the global importance prediction model is based on information associated with a plurality of users.

11. The system of claim 10, wherein the one or more programs further include instructions for:
in accordance with a determination that the set of messages do not include any unread priority messages:
foregoing presenting a new mail notification.

12. The system of claim 10, wherein presenting the new mail notification includes one of:
- displaying a count of the one or more unread priority messages; or
- displaying a sender of an unread priority message of the one or more priority messages.

13. The system of claim 10, wherein the importance score associated with a respective message is generated by:
- determining a first weight for the respective message using the global importance prediction model;
- determining a second weight for the respective message using the user importance prediction model; and
- combining the first weight and the second weight.

14. The system of claim 10, wherein the global importance prediction model includes a plurality of social graph-related weights.

15. The system of claim 10, wherein the one or more programs further comprise instructions for:
- displaying the one or more unread priority messages in a portion of a display that is separate from a portion of the display used to display messages that fail to satisfy the one or more predefined message importance criteria.

16. The system of claim 10, wherein the one or more programs further comprise instructions for:
- collecting, from a user, feedback data regarding importance of a message of the set of messages; and
- updating the user importance prediction model in accordance with the feedback data.

17. The system of claim 10, wherein the importance score associated with a respective message is generated based also at least in part on a group importance prediction model.

18. The system of claim 17, wherein the group importance prediction model is based on information associated with a group of users.

19. A non-transitory computer readable storage medium storing one or more programs for execution by the one or more processors of a computer system, the one or more programs comprising instructions for:
- receiving message information from a server system, the message information representing a set of messages, and an importance score associated with each respective message in the set of messages, wherein the importance score is generated based at least in part on a global importance prediction model, and a user importance prediction model;
- in accordance with a determination that the set of messages include one or more unread priority messages, wherein priority messages comprise messages with which the associated importance score satisfy one or more predefined message importance criteria:
  - presenting a new mail notification, wherein
  - the global importance prediction model includes a social graph-related weight,
  - the user importance prediction model is based on information associated with a single user, and
  - the global importance prediction model is based on information associated with a plurality of users.

20. The non-transitory computer readable storage medium of claim 19, wherein the one or more programs further comprising instructions for:
- in accordance with a determination that the set of messages do not include any unread priority messages:
  - foregoing presenting a new mail notification.

21. The non-transitory computer readable storage medium of claim 19, wherein presenting the new mail notification includes one of:
- displaying a count of the one or more unread priority messages; or
- displaying a sender of an unread priority message of the one or more priority messages.

22. The non-transitory computer readable storage medium of claim 19, wherein the importance score associated with a respective message is generated by:
- determining a first weight for the respective message using the global importance prediction model;
- determining a second weight for the respective message using the user importance prediction model; and
- combining the first weight and the second weight.

23. The non-transitory computer readable storage medium of claim 19, wherein the global importance prediction model includes a plurality of social graph-related weights.

24. The non-transitory computer readable storage medium of claim 19, wherein the one or more programs further comprise instructions for:
- displaying the one or more unread priority messages in a portion of a display that is separate from a portion of the display used to display messages that fail to satisfy one or more predefined message importance criteria.

25. The non-transitory computer readable storage medium of claim 19, wherein the one or more programs further comprise instructions for:
- collecting, from a user, feedback data regarding importance of a message of the one or more priority messages; and
- updating the user importance prediction model in accordance with the feedback data.

26. The non-transitory computer readable storage medium of claim 19, wherein the importance score associated with a respective message is generated based also at least in part on a group importance prediction model.

27. The non-transitory computer readable storage medium of claim 26, wherein the group importance prediction model is based on information associated with a group of users.

* * * * *